United States Patent
Jacob et al.

(10) Patent No.: US 12,444,462 B2
(45) Date of Patent: Oct. 14, 2025

(54) ELECTRO-OPTICAL HIGH BANDWIDTH ULTRAFAST DIFFERENTIAL RAM

(71) Applicant: UNIVERSITY OF SOUTHERN CALIFORNIA, Los Angeles, CA (US)

(72) Inventors: Ajey Poovannummoottil Jacob, Los Angeles, CA (US); Akhilesh Ramlaut Jaiswal, Los Angeles, CA (US); Ramesh Kudalippalliyalil, Los Angeles, CA (US); Sujith Chandran, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 174 days.

(21) Appl. No.: 18/281,662

(22) PCT Filed: Mar. 14, 2022

(86) PCT No.: PCT/US2022/020210
§ 371 (c)(1),
(2) Date: Sep. 12, 2023

(87) PCT Pub. No.: WO2022/192784
PCT Pub. Date: Sep. 15, 2022

(65) Prior Publication Data
US 2024/0170055 A1  May 23, 2024

Related U.S. Application Data

(60) Provisional application No. 63/160,173, filed on Mar. 12, 2021.

(51) Int. Cl.
G11C 13/04   (2006.01)
G02F 1/225   (2006.01)
G11C 11/42   (2006.01)

(52) U.S. Cl.
CPC ............. *G11C 11/42* (2013.01); *G02F 1/225* (2013.01); *G11C 13/047* (2013.01); *G02F 2203/15* (2013.01)

(58) Field of Classification Search
CPC ....... G11C 11/42; G11C 13/047; G02F 1/225; G02F 2203/15
See application file for complete search history.

(56) References Cited

U.S. PATENT DOCUMENTS

| 5,566,261 A | 10/1996 | Hall et al. |
| 2006/0222038 A1 | 10/2006 | Yamazaki |
| 2018/0261288 A1* | 9/2018 | Frumkin ............ G02B 6/12004 |
| 2023/0038024 A1* | 2/2023 | Zhang ................... G11C 11/418 |
| 2023/0207008 A1* | 6/2023 | Miscuglio ............ G11C 13/004 |
| | | 365/163 |
| 2024/0127040 A1* | 4/2024 | Shiflett ................... G02F 1/212 |

OTHER PUBLICATIONS

Kudalippalliyalil, R. et al., "Towards Scalable, Energy-Efficient and Ultra-Fast Optical SRAM," Nov. 25, 2021, pp. 1-5.
International Search Report & Written Opinion dated Jul. 7, 2022 for PCT Appn. No. PCT/US22/020210 filed Mar. 14, 2022, 18 pgs.

* cited by examiner

*Primary Examiner* — Min Huang
(74) *Attorney, Agent, or Firm* — Brooks Kushman P.C.

(57) ABSTRACT

An electro-optic random-access memory enables (1) ultra-fast write and read operation (2) featuring differential sensing (3) wavelength, and polarization multiplex high bandwidth memory access (4) enables very large-scale memory array for wafer scale ICs.

47 Claims, 15 Drawing Sheets

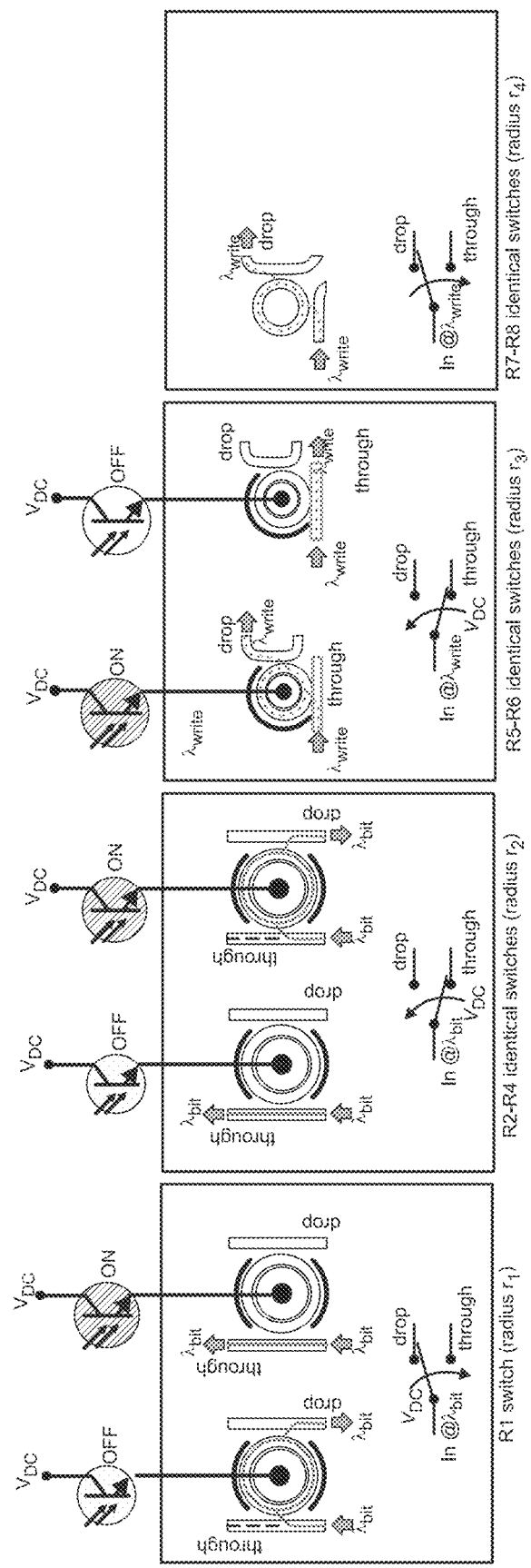

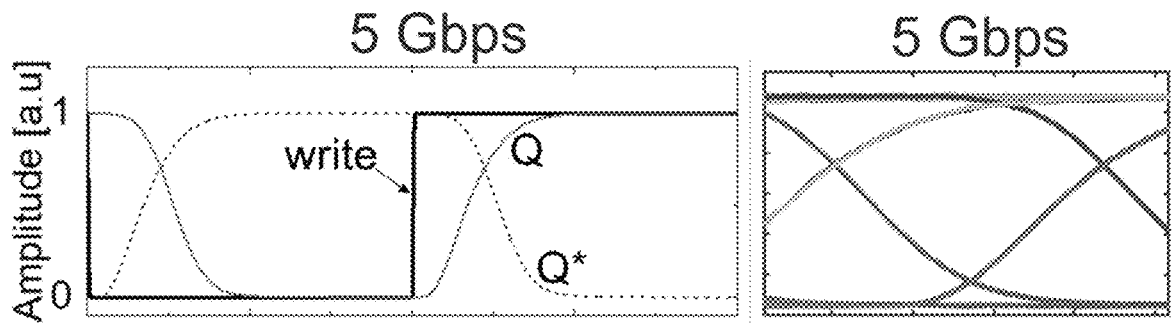
Fig. 11A
Fig. 11D
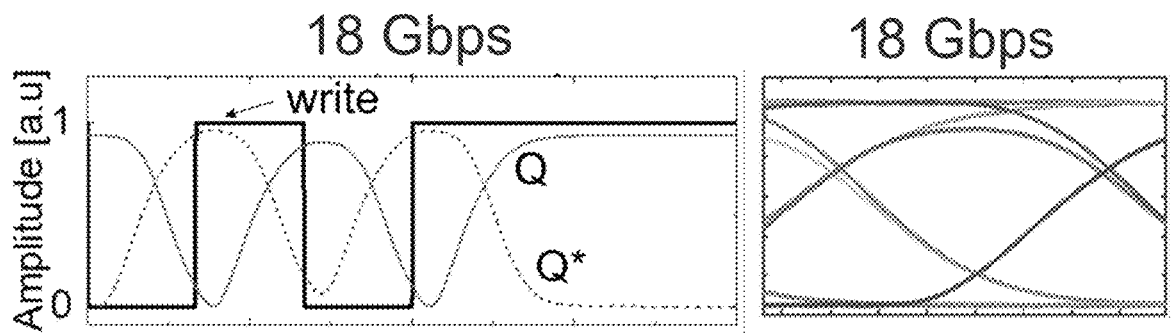
Fig. 11B
Fig. 11E
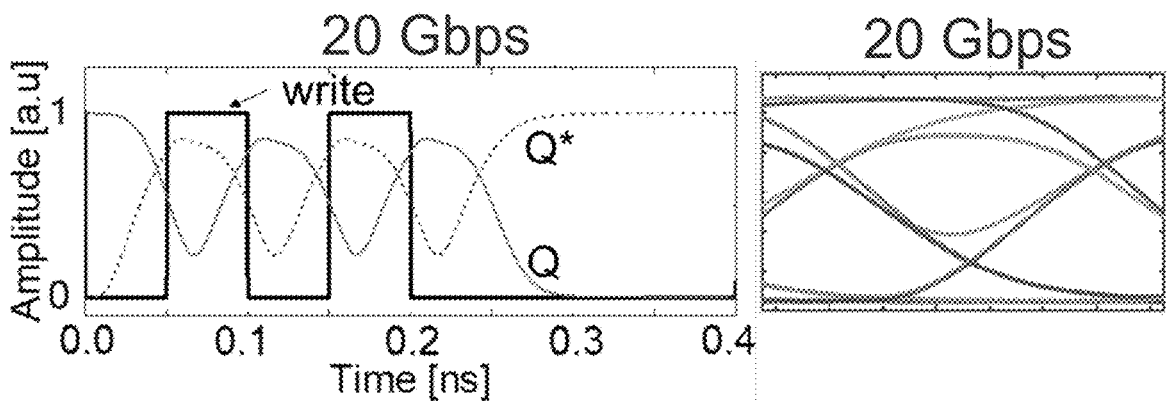
Fig. 11C
Fig. 11F

ELECTRO-OPTICAL HIGH BANDWIDTH ULTRAFAST DIFFERENTIAL RAM

CROSS-REFERENCE TO RELATED APPLICATIONS

This application is the U.S. national phase of PCT Appln. No. PCT/US2022/020210 filed Mar. 14, 2022, which claims the benefit of U.S. provisional application Ser. No. 63/160,173 filed Mar. 12, 2021, the disclosures of which are hereby incorporated in their entirety by reference herein.

TECHNICAL FIELD

In at least one aspect, the present invention relates to ultrafast random access memory designs.

BACKGROUND

Optical random access memory (RAM) is a high-bandwidth alternative to electronic RAM. As this technology continues to emerge, designs that increase switching speed and optimize the density of the memory cells are needed.

SUMMARY

In at least one aspect, an electro-optical high bandwidth ultra-fast differential RAM (LEO-RAM) cell is provided. The LEO-RAM cell includes a first ring resonator that couples a first waveguide to a second waveguide such that the first waveguide receives a first optical signal. The LEO-RAM cell also includes a second ring resonator that couples a third waveguide to a fourth waveguide such that the third waveguide receives a second optical signal. A first phototransistor has a base (or gate) coupled to the output of the second ring resonator through the third waveguide. The first phototransistor is configured to operate the first ring resonator. The first ring resonator is configured to operate at a first resonant wavelength $\lambda_{bit}$ when the first phototransistor is "OFF" such that light output appears at a drop port of the first ring resonator thereby switching the second phototransistor "ON". First ring resonator R1 is configured to operate at non-resonant for $\lambda_{bit}$ when first phototransistor T1 is "ON" such that second transistor T2 turns "OFF." LEO-RAM cell 10 also includes a second phototransistor T2 having a base (or gate) coupled to an output of the first ring resonator R1 through the second waveguide W2. The second phototransistor T2 is configured to operate the second ring resonator R2. Characteristically, the second ring resonator R2 is configured to operate at the same resonant wavelength $\lambda_{bit}$ when the second phototransistor T2 is "ON" such that when the second ring resonator R2 is at resonance, no light will transfer to the first phototransistor T1.

In another aspect, an electro-optic random-access memory enables (1) ultra-fast write and read operation (2) featuring differential sensing (3) wavelength, and polarization multiplex high bandwidth memory access (4) enables very large-scale memory array for wafer-scale ICs.

In another aspect, an electro-optic random-access memory includes an electro-optic latch using cross-coupled phototransistor and optical modulators, differential readout using integrated optical ring modulators, differential write using integrated optical ring modulators and high-speed optical selection of a memory cell(s) using waveguide coupled phototransistor.

In another aspect, a method of forming an electro-optic integrated memory structure comprising of waveguides, phototransistors, ring modulators, power splitters, and laser elements is provided.

In another aspect, an O-SRAM cell having ring resonators and photodiodes is provided. The O-SRAM cell includes a first ring resonator R1 having a first ring resonator drop-port that represents a state Q* and a second ring resonator R2 having a second ring resonator drop-port that represents a state Q. A first photodiode D1 controls the first ring resonator R1 through the first waveguide W1. The ON state of first photodiode D1 implies that first ring resonator R1 is resonant to an input light having wavelength $\lambda_{bit}$ thereby transferring maximum optical power to the first ring resonator drop-port. A second photodiode D2 that controls the second ring resonator R2 through a second waveguide W2. The ON state of the second photodiode D2 implies that the second ring resonator R2 is resonant to the input light having wavelength $\lambda_{bit}$ thereby transferring maximum optical power to the second ring resonator drop-port.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIGS. 3A, 3B-1, and 3B-2. (A) 3D schematic of an optical MRR switch integrated with p-n phase shifter, (B) top view and cross-section of the phase shifter. t and k are self and cross-coupling coefficient between the ring and bus waveguide, R—radius of the ring, G—gap of the coupling region, $L_p$—length of phase-shifter and W—width, H—height and d—etch depth of waveguide.

FIGS. 5A, 5B, 5C, and 5D. Switching conditions of active (R1-R6) and passive (R7-R8) MRRs. $\lambda_{bit}$ is the resonant wavelength of R1-R4 and $\lambda_{write}$ is the resonant wavelength of R5-R8.

FIGS. 11A, 11B, 11C, 11D, 113E, and 11F. Simulated switching characteristics (Q and Q*) and corresponding eye-diagrams (calculated at Q output) of the O-SRAM when a 'write' pulse at different data rates is applied at the BIT/BIT* waveguide.

DETAILED DESCRIPTION

Figure 1:
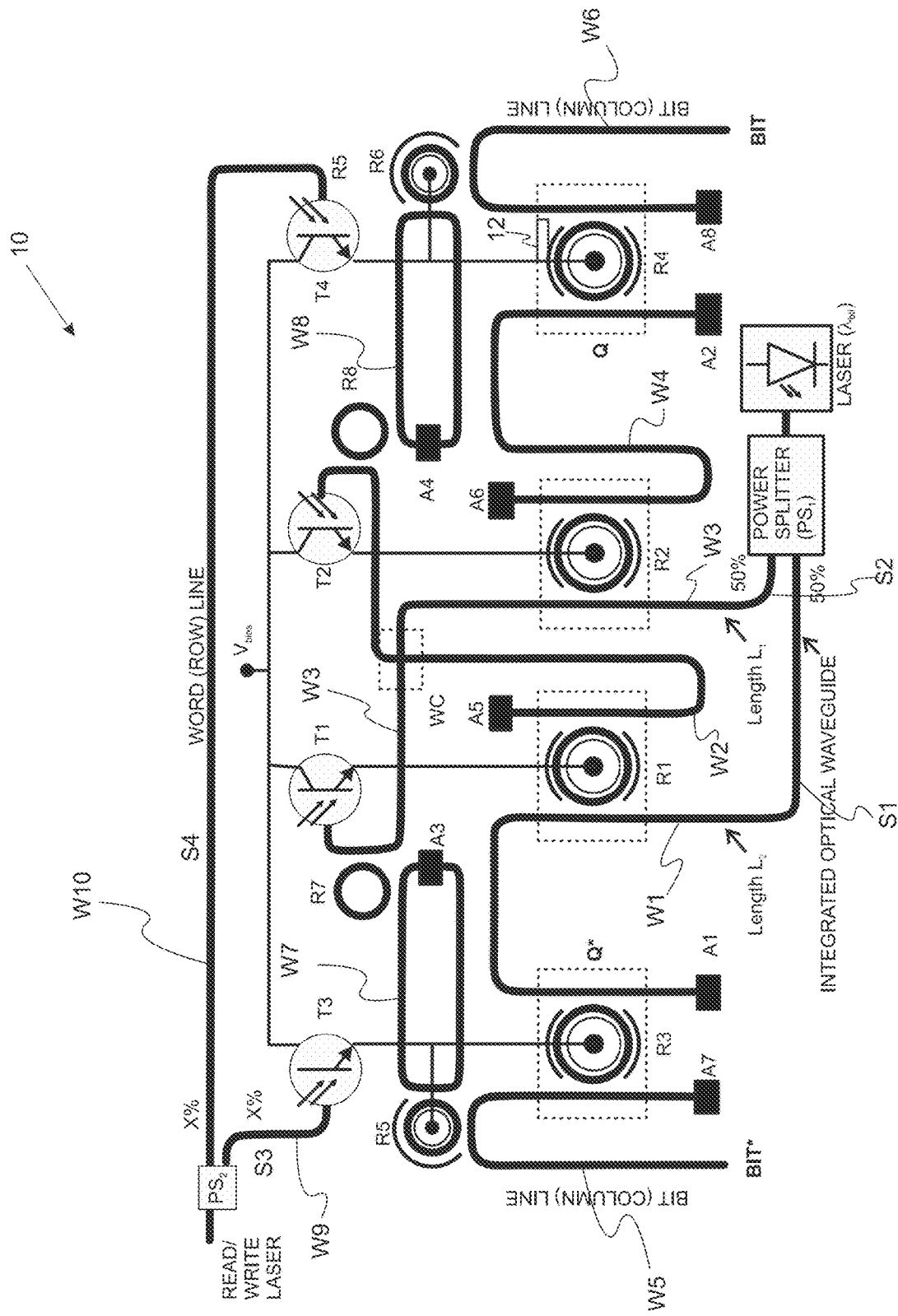
FIG. 1. The proposed LEO-RAM cell layout. R1-R6 are active micro-ring resonator (MRR) switches integrated with electro-optic phase shifters, R7-R8 are passive MRRs, T1-T4 are phototransistors, PS1-PS2 are optical power splitters, A1-A8 are optical absorbers (metal) and WC is waveguide crossing. The thick black lines represents integrated optical waveguides and thin black solid lines represents electrical lines.
Figures 2A, 2B:
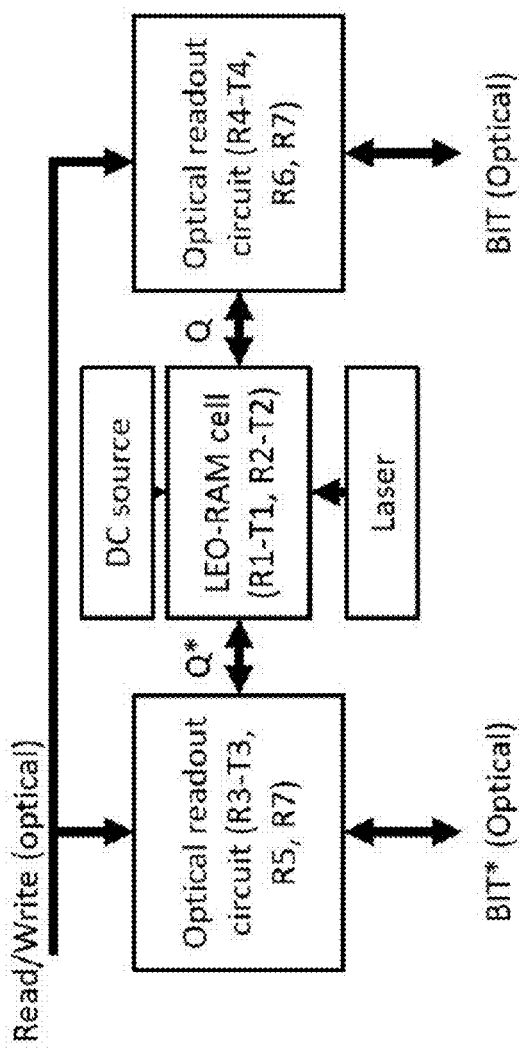
FIGS. 2A and 2B. (A) Block diagram of proposed LEO-RAM. Both BIT and BIT* outputs are used for differential sensing. (B) Truth table of the memory.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numerical quantity, in a refinement, the term "less than" includes a lower non-included limit that is 5 percent of the number indicated after "less than." A lower non-includes limit means that the numerical quantity being described is greater than the value indicated as a lower non-included limited. For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, 1 percent, or 0 percent of the number indicated after "less than."

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "electrical signal" refers to the electrical output from an electronic device or the electrical input to an electronic device. The electrical signal is characterized by voltage and/or current. The electrical signal can be stationary with respect to time (e.g., a DC signal) or it can vary with respect to time.

Throughout this application, where publications are referenced, the disclosures of these publications in their entireties are hereby incorporated by reference into this application to more fully describe the state of the art to which this invention pertains.

ABBREVIATIONS

"LEO-RAM" means linear electro-optical differential RAM.

"MRR" means microring resonator.

"O-SRAM" means optical-SRAM.

"SOI" means silicon-on-insulator.

The term "HIGH" means that a voltage is approximately equal to a DC voltage source ($V_{DC}$ or $V_{bias}$), which is typically from 1 to 5 volts. In a refinement, "HIGH" is equated to digital bit 1. The term "LOW" means that a voltage is approximately equal to ground or a second voltage reference that is different than (and typically, lower than) the DC voltage source ($V_{bias}$). In a refinement, "HIGH" is equated to digital bit 1.

With respect to phototransistors and photodiodes, the term "ON" means that the phototransistor or photodiode is enabled and will pass an electrical current. Similarly, the term "OFF" means that the phototransistor or photodiode is not enabled and will not pass an electrical current beyond potential small leakage currents.

1. Linear Electro-Optic Random Access Memory (LEO-RAM)

In general, FIG. 1 shows the layout of the proposed optical RAM (LEO-RAM) based on micro-ring resonator (MRR) switches. LEO-RAM 10 includes The MRR switches R1, R2, R3, R4, R5, and R6 includes linear electro-optic phase shifters which are controlled by corresponding phototransistors T1, T2, T3, and T4 respectively. The circuit consists of an internal laser source, integrated optical waveguides (thick lines), active MRRs (R1-R6), phototransistors (T1-T4), passive MRRs (R7-R8), light absorbers (A1-A8), power splitters (PS1-PS2), and waveguide crossings (WC).

With reference to FIG. 1, a schematic of an electro-optical high bandwidth ultra-fast differential RAM cell is provided. LEO-RAM cell 10 includes a first ring resonator R1 that couples a first waveguide W1 to a second waveguide W2 such that the first waveguide W1 receives a first optical signal S1. LEO-RAM cell 10 also includes a second ring resonator R2 that couples a third waveguide W3 to a fourth waveguide W4 such that the third waveguide W3 receives a second optical signal S2. A first phototransistor T1 has a base (or gate) coupled to an output of the second ring resonator R2 through the third waveguide W3. The first phototransistor T1 is configured to operate the first ring resonator R1. The first ring resonator R1 is configured to operate at a first resonant wavelength $\lambda_{bit}$ when the first phototransistor T1 is OFF such that light output appears at a drop port of the first ring resonator R1 thereby switching second phototransistor T2 "ON". First ring resonator R1 is configured to operate at non-resonant for $\lambda_{bit}$ when first phototransistor T1 is "ON" such that second phototransistor T2 turns "OFF." LEO-RAM cell 10 also includes a second phototransistor T2 having a base (or gate) coupled to an output of the first ring resonator R1 through the second waveguide W2. The second phototransistor T2 is configured to operate the second ring resonator R2. Characteristically, the second ring resonator R2 is configured to operate at the same resonant wavelength $\lambda_{bit}$ when the second phototransistor T2 is "ON" such that when the second ring resonator R2 is at resonance, no light will transfer to the first phototransistor T1.

In a further refinement, LEO-RAM cell 10 can further include a third ring resonator R3 that couples a BIT* waveguide W5 to the first waveguide W1. LEO-RAM cell 10 can also include a fourth ring resonator R4 that couples a BIT waveguide W6 to the fourth waveguide W4 and a third phototransistor T3 having its base (or gate) coupled to a first Read/Write light signal S3 via a ninth waveguide W9. The third phototransistor T3 is configured to activate the third ring resonator R3 and to operate the third ring resonator R3. LEO-RAM cell 10 can also include a fourth phototransistor T4 having its base (or gate) coupled to a second Read/Write light signal S4 via a tenth waveguide W10. The fourth phototransistor T4 is configured to operate the fourth ring resonator R4. Characteristically, the third ring resonator R3 and the fourth ring resonator R4 are configured for read operations when the third phototransistor T3 and the fourth phototransistor T4 are ON. In a refinement, the third ring resonator R3 and the fourth ring resonator R4 are configured to operate at resonant to the same wavelength+as the first ring resonator R1 and the second ring resonator R2.

In a further refinement, LEO-RAM cell 10 includes a fifth ring resonator R5 that is coupled to the first phototransistor T1. A sixth ring resonator R6 is similarly coupled to the second phototransistor T2. The fifth ring resonator R5 can be controlled by the third phototransistor T3 and the sixth ring resonator R6 can be controlled by the fourth phototransistor T4. Characteristically, the fifth ring resonator R5 and the sixth ring resonator R6 are resonant to a different wavelength $\lambda_{write}$. A $\lambda_{write}$ signal is sent to the memory cell through a BIT* waveguide W5 or a BIT waveguide W6. In a further refinement, the fifth ring resonator R5 couples the BIT* waveguide W5 to a seventh waveguide W7 which is in turn coupled to a seventh ring resonator R7 which is in turn coupled to the first phototransistor T1. In a further refinement, the sixth ring resonator R6 couples the BIT waveguide W6 to an eight waveguide W8 coupled to an eighth ring resonator R8 which is coupled to the second phototransistor T2. Characteristically, the fifth ring resonator R5, sixth ring resonator R6, seventh ring resonator R7, and eighth ring resonator R8 are used for write operations.

Still referring to FIG. 1, when third phototransistor T3 (or fourth phototransistor T4) is ON, a $\lambda_{write}$ signal in the BIT* waveguide W5 (or the BIT waveguide W6) is transferred to a corresponding drop port of fifth ring resonator R5 (or the sixth ring resonator R6). Therefore, $\lambda_{write}$ signal reaches an input of the seventh ring resonator R7 (or ring resonator R8). Typically, seventh ring resonator R7 (or the ring resonator R8) are passive MRRs designed to operate at resonant wavelength $\lambda_{write}$. In a refinement, when the third phototransistor T3 (or fourth phototransistor T4) is ON, the write signal $\lambda_{write}$ reaches the base of the first phototransistor T1 (or second phototransistor T2) through the seventh ring resonator R7 (or eighth ring resonator R8), which is applied to the BIT* waveguide W5 (or the BIT waveguide W6).

The LEO-RAM cells can include a thermal heater 12 associated with the microring resonators (e.g., a microring resonator thermal heater) for wavelength reconfiguration as depicted for microring resonator R4 in FIG. 1.

It should be appreciated that the LEO-RAM cells can be configured to operate in a range of wavelengths, and in particular communication wavelengths of 1.3 or 1.5 um.

The LEO-RAM cells set forth above can be fabricated onto a number of different substrates. Such substrates can be composed of a semiconductor, a dielectric, or combinations. For example, the substrate can be composed of silicon nitride, aluminum nitride, sapphire, zinc oxide, or combinations thereof. Typically, the substrate will be a wafer, and in particular, a semiconductor wafer. In a refinement, the wafer is composed of silicon, germanium, III-V semiconductors, or II-VI semiconductors, or combinations thereof. In a variation, a photonic device includes one or more LEO-RAM cells set forth herein. In a refinement, such a photonics device is composed of silicon dioxide, silicon, silicon nitride, aluminum nitride, indium gallium arsenide, other III-V semiconductor materials, polymers, or combinations thereof. In other variations, the active photonic components such as phototransistors and/or the semiconductor components of the ring resonators are composed of silicon, germanium, or combinations thereof.

The working principle of this circuit is analogous to that of an electrical static Random-Access Memory (SRAM) cell. Here, instead of electrical signals the information is stored/processed in the optical signal. The wavelength/frequency of the light signal is decided by the optical transparency range of the material platform. For example, silicon is one of the most commonly used material platforms for passive and active integrated photonics applications because of its wide transparency range (low absorption) in the optical telecommunication band near 1.55 µm, high refractive index (~3.5), availability, and CMOS compatibility, etc. Here, we consider the above circuit is integrated on a silicon-on-insulator (SOI) platform.

Figure 3A:
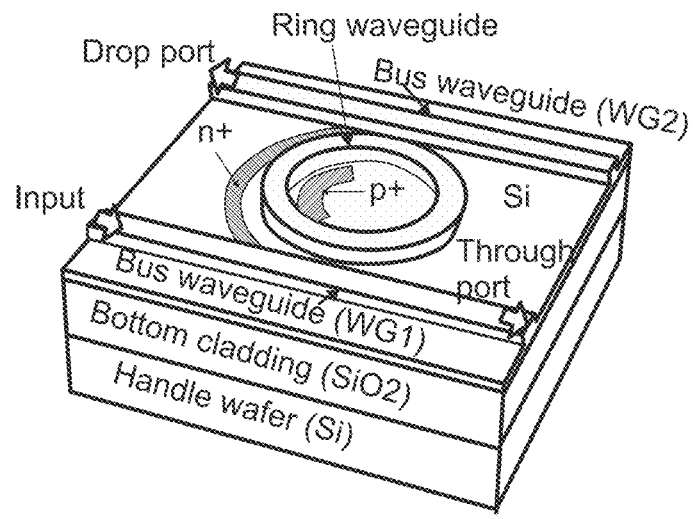
Figures 1, 2, 3B:
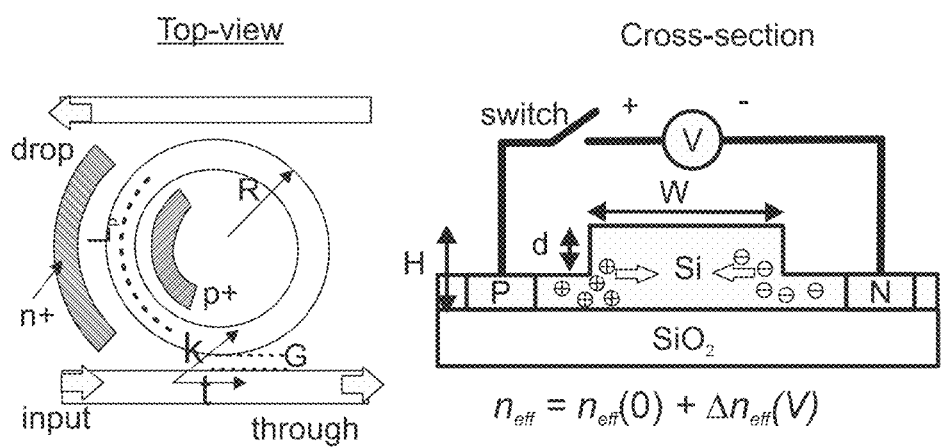

A block diagram representation of the above LEO-RAM in FIG. 1 is shown in FIG. 2 along with a truth table. Here, the ring resonators R1-R2 and phototransistors T1-T2 together form the unit cell of LEORAM. The base (or gate) of T1 and T2 are coupled to the outputs R2 and R1 respectively. The R3-T3 along with R5&R7 and R4-T4 along with R6&R8 are used for the external optical read/write operation. The memory outputs (Q, Q*) and bit lines (BIT, BIT*) are coupled through R3 and R4 respectively. The read/write operation is activated by sending an optical signal to the phototransistors through the Read/Write waveguide. To write or flip the memory state, another external impulse light signal is applied to the memory cell through the BIT/BIT* lines. Here the output states are represented by 'HIGH' and 'LOW' states, where 'HIGH' means maximum light intensity reached at an output port (input–total loss) when it is at logic 1, whereas 'LOW' means the light intensity (depends on the extinction ratio at resonance, typically <1% of the input power) at an output when it is supposed to be at a logic 0 level. In ideal conditions, the output power will be equal to input power in the logic HIGH state and it will be zero in the LOW-state. A brief description of an active MRR switch is discussed below, followed by the memory operations.

1.1. MRR Switch

The core element of this circuit is the active MRR switch. A 3D schematic of an MRR with an integrated p-n junction phase shifter is shown in FIG. 3(A). The device is integrated in an SOI platform with air or oxide as top cladding. The ring waveguide is coupled to two straight waveguides through the evanescent optical field in the gap G. The coupling strength $|k|^2$ depends on the waveguide cross-section parameters (W, H, d, and G), coupling length, and operating wavelength [1]. At some wavelengths, say resonant wavelengths, the light in the input bus waveguide and circulating light in the ring waveguide will destructively interfere in the coupling region resulting in zero (ideally) transmission at the through-port. This resonant light in the ring waveguide can be partially transmitted to the drop port by keeping another waveguide (WG2) near the ring as shown in FIGS. 3(A) and 3(b). The intensity of light transmitted (at resonance) to the through-port (minimum) and drop-port (maximum) is a function of coupling strength and waveguide loss in the ring resonator. Also, the resonance condition of the ring depends on the phase added to the input light (at λ) in one round trip in the ring, which is a function of ring perimeter (L=2πR) and effective index ($n_{eff}$) of the waveguide. The resonant wavelength is mathematically expressed as $\lambda_r = n_{eff} L/m$ where m=1, 2, 3 . . . is the resonance order. (A more detailed explanation of ring resonators can be seen elsewhere [1]). Thus, for a fixed waveguide geometry (fixed radius and waveguide cross-section) the resonant wavelength of the ring can be changed by changing the effective index of the propagating mode. This can be achieved by adding a phase shifter in the ring waveguide. An electro-optic phase shifter is realized by introducing p and n doping to both sides of the waveguide forming a p-i-n diode. Carriers injected into the waveguide core (intrinsic region) in the forward bias condition change the effective index and absorption of the optical mode in the waveguide [2, 3].

Figure 4A:
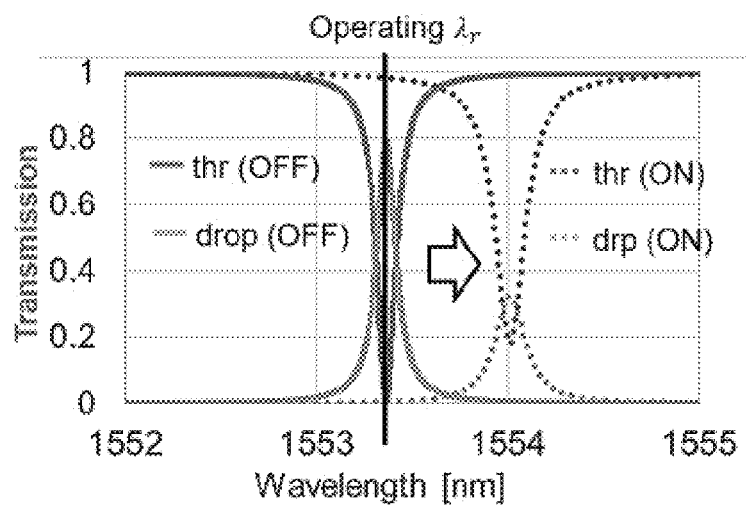
FIGS. 4A and 4B. (A) Typical transmission characteristics of an MRR switch in OFF state (no bias) and ON state (bias). In this case, the DC bias drives MRR from resonance at resonant wavelength $\lambda r$ to out-of-resonance. (B) Schematic switch and waveform representations.

Wavelength-dependent transmission characteristics of a typical MRR is shown in FIG. 4(A) for the OFF (biased at V=0) and ON (biased at V) state of the phase shifter. As an example, the resonant wavelength of the ring in OFF is near $\lambda_r$=1553.3 nm and is shifted to $\lambda'_r$=1554 nm in the ON state. Thus, an MRR can be designed to resonate at any desired $\lambda_r$ such that maximum input power is transmitted to the drop port (and minimum to the through-port) under resonance.

1.2. Design Specifications and Working Design

In our circuit, the MRR switches R1-R4 are controlled by phototransistors T1-T4 respectively. T3 and T4 also control additional MRRs R5 and R6 respectively which are used for write operations (see section 2.2). R1 is designed to operate at a resonant wavelength $\lambda_{bit}$ when T1 is OFF. See FIG. 5 (A). In resonance, the light output appears at its drop port and switches ON T2. Similarly, when T1 is ON, R1 shift to non-resonant for $\lambda_{bit}$ and turns OFF T2. Here the control transistor T1 is operated according to the output of R2. R2 is designed to operate at the same resonant wavelength $\lambda_{bit}$ when T2 is ON. See FIG. 5 (B). When R2 is at resonance, no light will transfer to (through the port of R2) T1. In other words, both transistors will never switch ON simultaneously, only one (T1 or T2) will be in ON state at any time during the memory operation. These conditions are achieved by choosing different radii for R1 (radius $r_1$) and R2 (radius $r_2$). To make the overall device footprint smaller, we use the smallest possible values for ring radii, typically in the range of 10 µm-20 µm, for SOI waveguides.

The MRR switches R3 and R4 are used for read operations and operate at resonant to same wavelength $\lambda_{bit}$ when the corresponding control transistors T3 and T4 are ON. Thus input light will transfer to drop port in ON state and to through-port in OFF state. This is similar to R2 as shown in FIG. 5 (B). Hence we use the same design radius $r_2$ for R3 and R4 (R2, R3, and R4 are identical).

The other MRRs R5-R8 are used for write operations. Here R5 and R6 are controlled by the same T3 and T4 respectively as before. However, these MRRs are resonant to a different wavelength $\lambda_{write}$ which is sent to the memory cell through the BIT* (or BIT) waveguide. See FIG. 5 (C). When T3 and T4 are ON, the $\lambda_{write}$ signal in the BIT* (or BIT) line transfer to the corresponding drop port of R5 (or R6) and reaches at the input of R7 (or R8). R7 and R8 are passive MRRs designed to operate at resonant wavelength $\lambda_{write}$ as shown in FIG. 5 (D). Hence, whenever T3 (T4) is ON, the write signal reaches at the base of R7 (or R8) which is applied to the BIT* (or BIT) line. R5 and R6 are designed with radius $r_3$ and R7 and R8 are designed with radius $r_4$. To make the design simple we keep the same waveguide cross-sectional geometry (width and height) for all the waveguides.

1.2.1. Hold State

Figure 6:
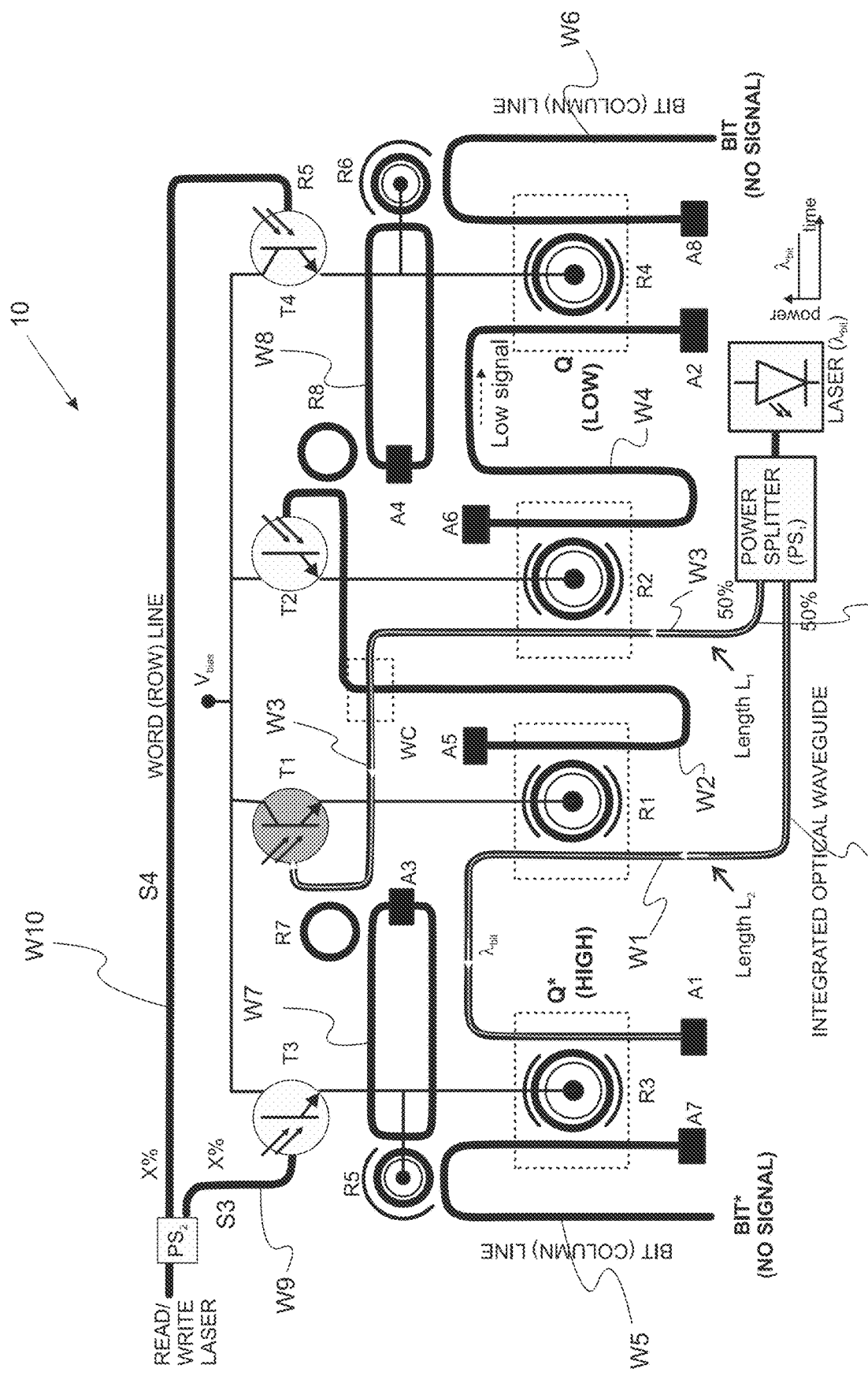
FIG. 6. The hold state corresponding to Q=LOW and Q*=HIGH. The gray sold lines represent the light (HIGH signal) path and grey dotted lines represent no-signal (or very low intensity).
Figure 7:
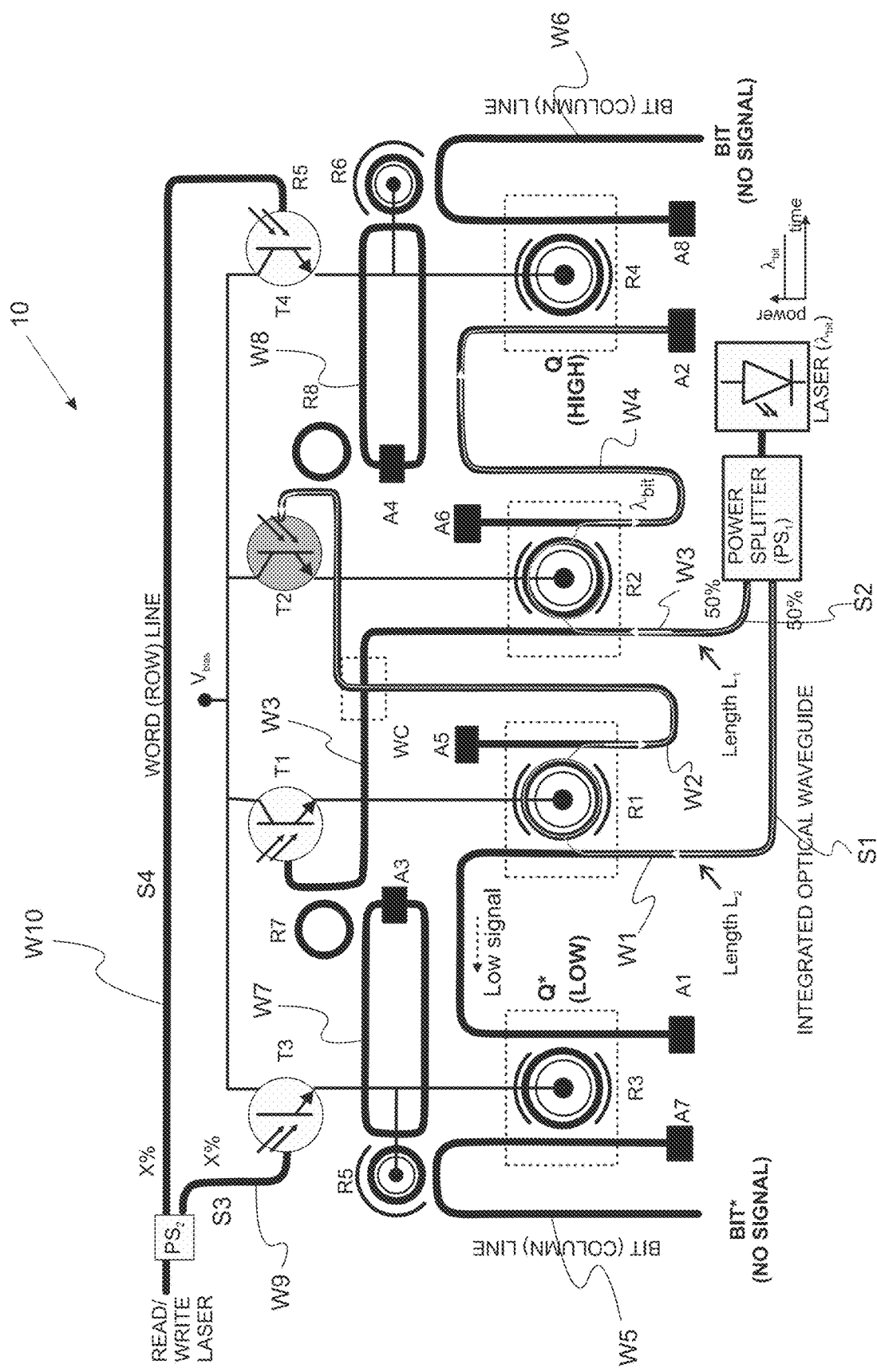
FIG. 7. The hold state corresponding to Q=HIGH and Q*=LOW. The gray sold lines represent the light (HIGH signal) path and grey dotted lines represent no-signal (or very low intensity).

In the hold state the memory cell remains in its output state as long as no Read/Write light signal is applied (T3-T4 OFF). The outputs Q* is the through-port of R1 and Q is the drop port of R2. When the memory is switched ON, the power splitter PS1 splits the internal laser light $\lambda_{bit}$ equally to rings R1 and R2. Since T1 and T2 cannot be simultaneously in the ON state, the initial state of memory is random. If we assume T1 is ON initially then Q is LOW (logic 0) otherwise if T2 is ON then Q is HIGH (logic 1). It remains in that state until an external write signal triggers the state. However, we expect the probability of Q=LOW state is more since T1 switches faster than T2. This is because the switching time (time to switch from OFF to ON) of T2 is the sum of the optical delay in connecting waveguide (length L2 from poser splitter to T2) and resonance delay of R1 (time to drive R1 in resonance), whereas T1 is connected directly at the through-port of R2, hence the switching time depends only the optical delay in L1. By choosing L2>L1 (T1 ON first) we can make the initial state deterministically at Q=LOW. The hold states for Q=LOW and Q*=HIGH is shown in FIG. 6. As discussed earlier, the $\lambda_{bit}$ is non-resonant to R1 and R2 when T1 is ON and T2 is OFF respectively. This makes sure that T1 is continuously powered by the through-port output of R2 and T2 remains in the OFF state since there is no signal in the R1 drop port. In short, Q=LOW and Q*=HIGH. Similarly, the memory hold state for Q=HIGH and Q*=LOW is shown in FIG. 7.

In both cases (not coupled to BIT lines) the light in Q and Q* will be absorbed by A1-A2 (metals) and eliminate reflections.

1.2.2. Write Operations

To switch the memory output state from one state to other, we need to trigger T1 or T2 (whichever is OFF) and turns it ON using an external write pulse. In order to activate this memory cell, we first send an optical signal (at any λ) in the read/write waveguide to switch ON the phototransistors T3 and T4. This will drive R3-R4 (resonant to $\lambda_{bit}$ and R5-R6 (resonant to $\lambda_{write}$ to their resonant conditions. Let us assume the memory is in one of the hold state, say Q=HIGH and Q*=LOW, as in FIG. 7. To write Q=LOW and Q*=HIGH, we send an optical pulse at $\lambda_{write}$ in the BIT* line (low output side). As discussed before, this signal is then transmitted to the drop port of R5 and reaches the phototransistor T1 through R7 (resonant to $\lambda_{write}$). This triggers T1 from OFF to ON state subsequently R1 turns OFF T2. This process makes Q=LOW and Q*=HIGH even after the write pulse is OFF.

Figure 8:
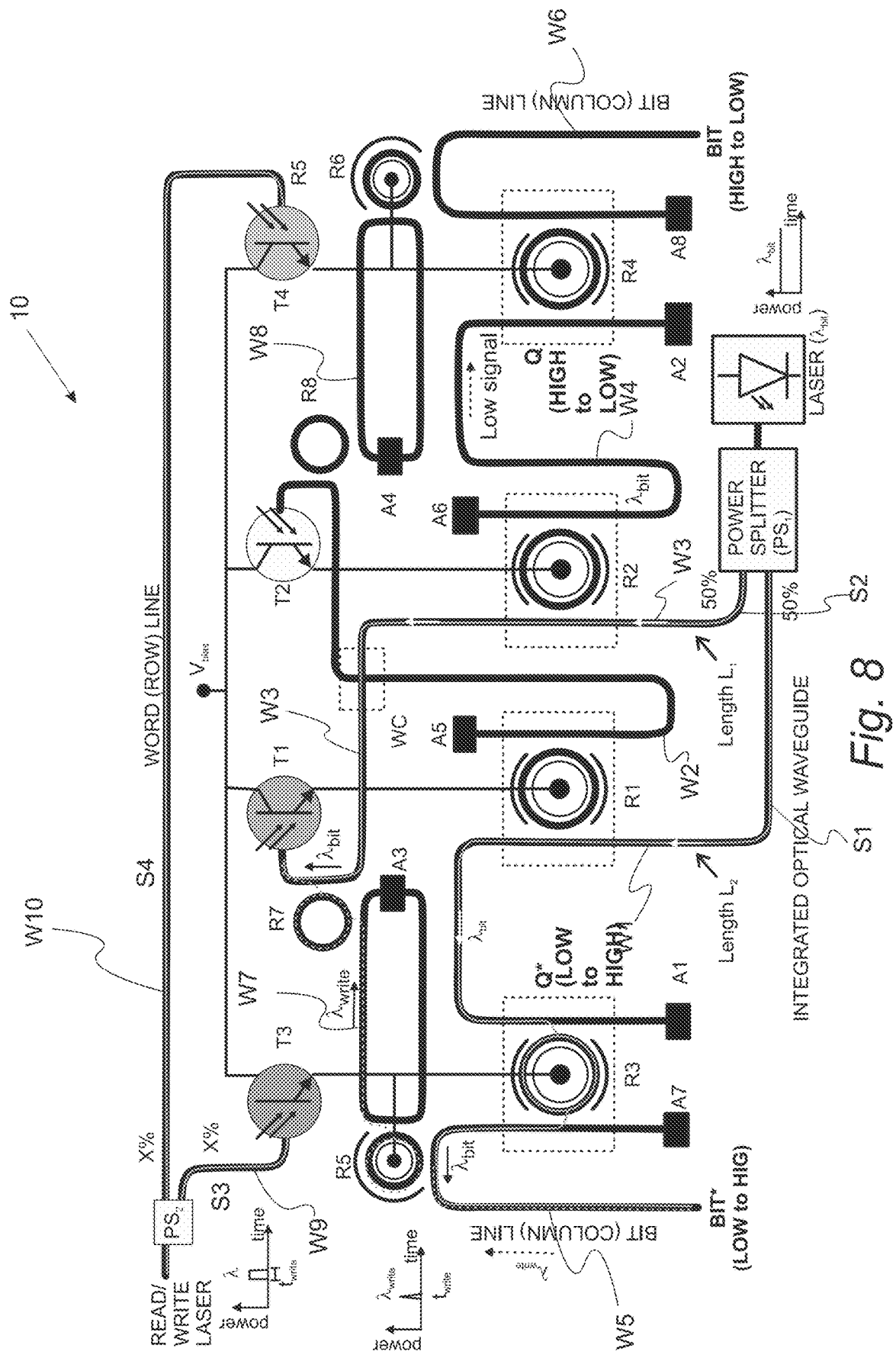
FIG. 8. The write operation of the memory cell. Assume initial conditions Q=HIGH and Q*=LOW. A high input pulse applied at the BIT* (LOW) line switches the memory to Q=LOW and Q*=HIGH. The gray sold lines represent the light (HIGH signal) path and grey dotted lines represent no-signal (or very low intensity).

The write operation described above is schematically shown in FIG. 8. If we apply the write pulse at the high output side (say, at BIT line when Q is HIGH) then the memory remains in its state unchanged.

During the write operation, the third phototransistor T3 (or fourth phototransistor T4) is ON, and thus ring resonator R5 (or ring resonator R6) is resonant to $\lambda_{write}$, and it reaches phototransistor T1 (or phototransistor T2) through ring resonator R7 (or ring resonator R8). However, $\lambda_{write}$, never disturbs internal laser source since ring resonator R3 (or ring resonator R4) is not resonant to $\lambda_{write}$, in its ON or OFF state.

1.23. Read Operation

Figure 9:
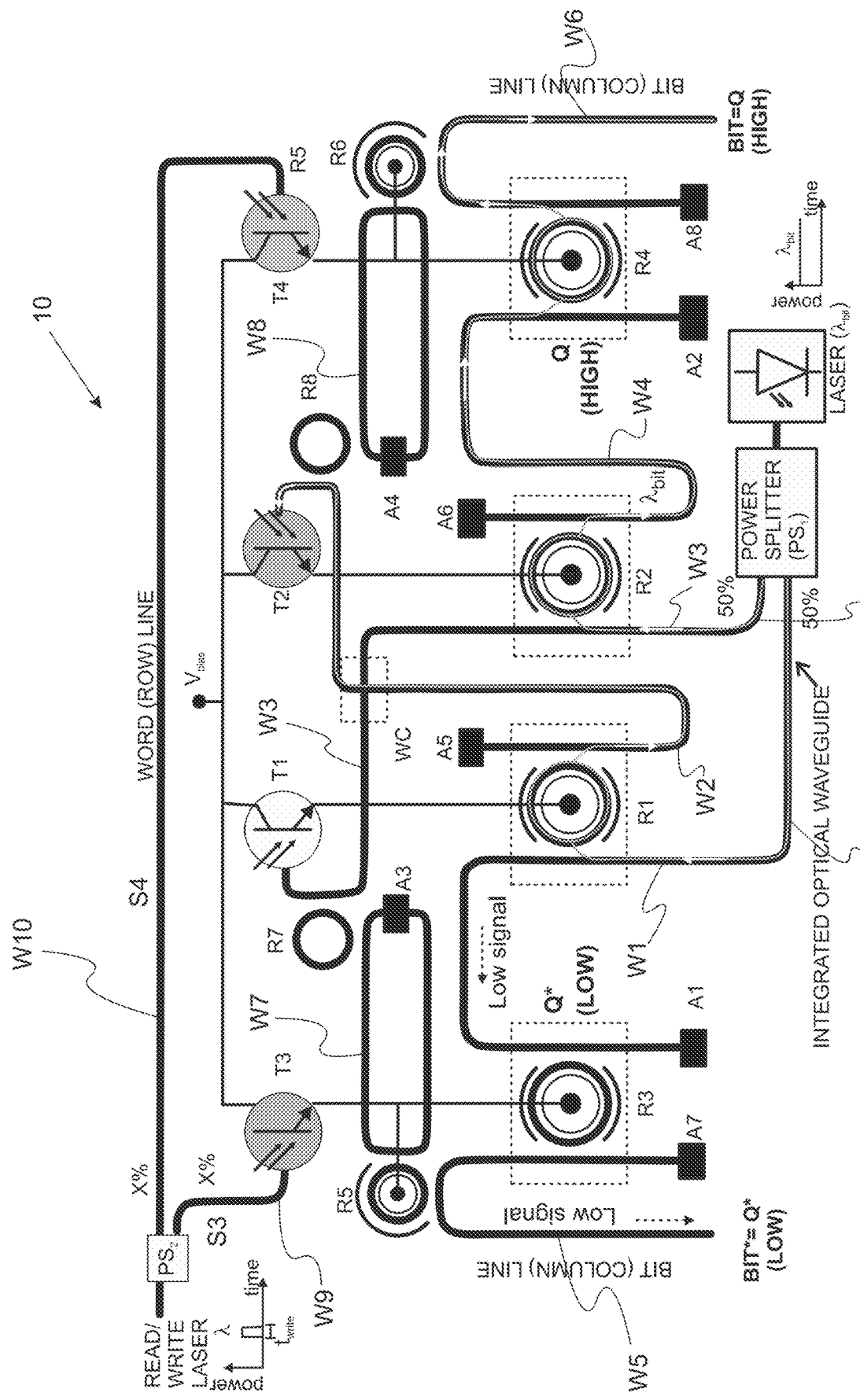
FIG. 9. The read operation of the memory cell. The Q and Q* outputs are transferred to BIT and BIT* lines respectively when light signal (any 1 to activate T3 and T4) applied to Read/Write waveguide. The gray sold lines represent the light (HIGH signal) path and grey dotted lines represent no-signal (or very low intensity).

The read operation is schematically shown in FIG. 9. Assume the memory is initially at Q=HIGH and Q*=LOW state as in FIG. 7. Similar to write operation, the memory cell is first activated by sending light (at any λ) through the read/write waveguide. This will turn ON T3 and T4, which then drives R3 and R4 in resonance for $\lambda_{bit}$ (see FIG. 5 (c)). Thus, the outputs Q and Q* will transfer to BIT and BIT* lines respectively. Since R5-R8 are not resonant to $\lambda_{bit}$, this process will not affect the present state of T1 and T2. The small amount of power (if any) coupled to R5 (from BIT* output) and R6 (from BIT output) will be absorbed by light absorbers (metal) A3 and A4.

1.3. Advantages

Ultra-fast write and read operations: The data is stored and processed in the optical domain. The operating speed is mainly limited by the phototransistor switching time of phototransistors and electro-optic switches. With existing designs in the literature we expect a switching speed above 10 GHz (0.1 ns).

Featuring differential sensing: Like electrical differential RAM, the BIT and BIT* outputs are used for differential sensing and ensure fast operation.

Wavelength, and polarization multiplex high bandwidth memory access: A single device/microring can be operated at multiple resonant wavelengths providing wavelength division multiplexed storage. Similarly optical signal can also be encoded in TE and TM polarizations.

Enables very large-scale memory array for wafer scale ICs: The LEO-RAM is the best solution for low density and ultra-fast wafer-scale memory array applications.

2. Scalable, Energy-Efficient and Ultra-Fast Optical SRAM

Figure 10A:
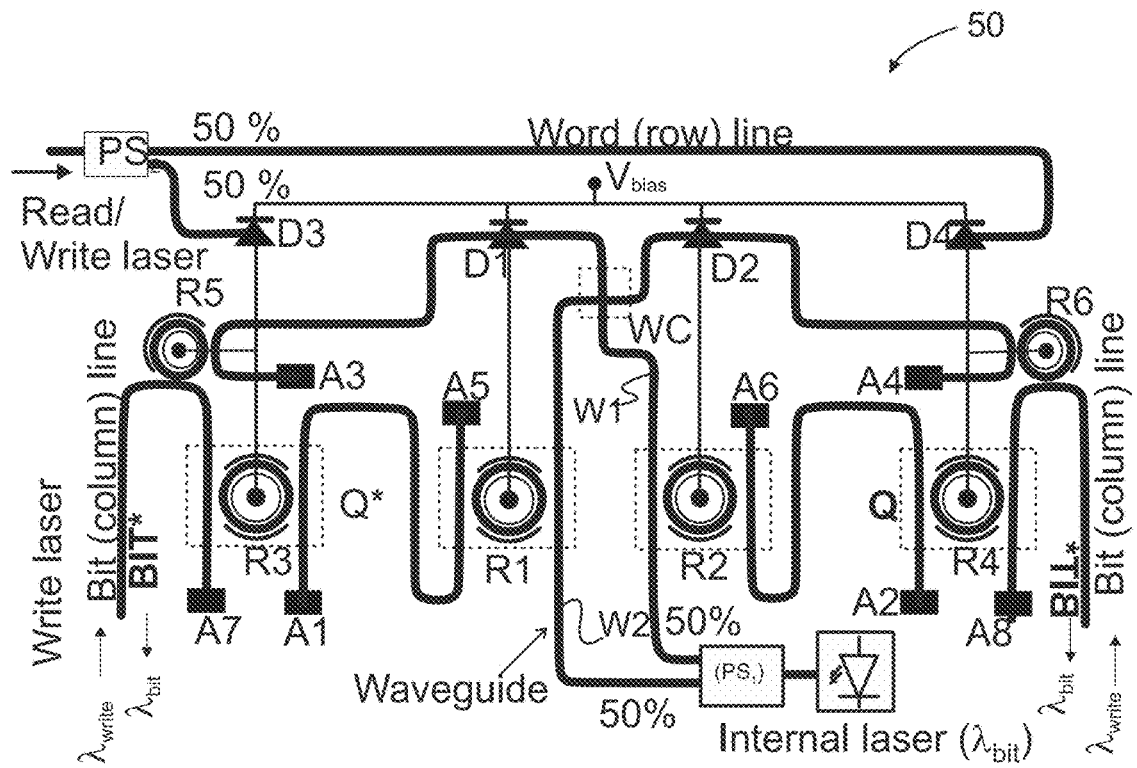
FIGS. 10A, 10B, and 10C. (A) The proposed O-SRAM cell layout, along with (B) its block diagram and truth table. R1-R6: active MRR switches, D1-D4: photodiodes, PS1-PS2: power splitters, A1-A8: passive light absorber, WC: waveguide crossing. The electrical wires and optical waveguides are represented by thin black lines and thick blue lines respectively. (C) O-SRAM cells arranged in a 2D memory array.
Figure 12:
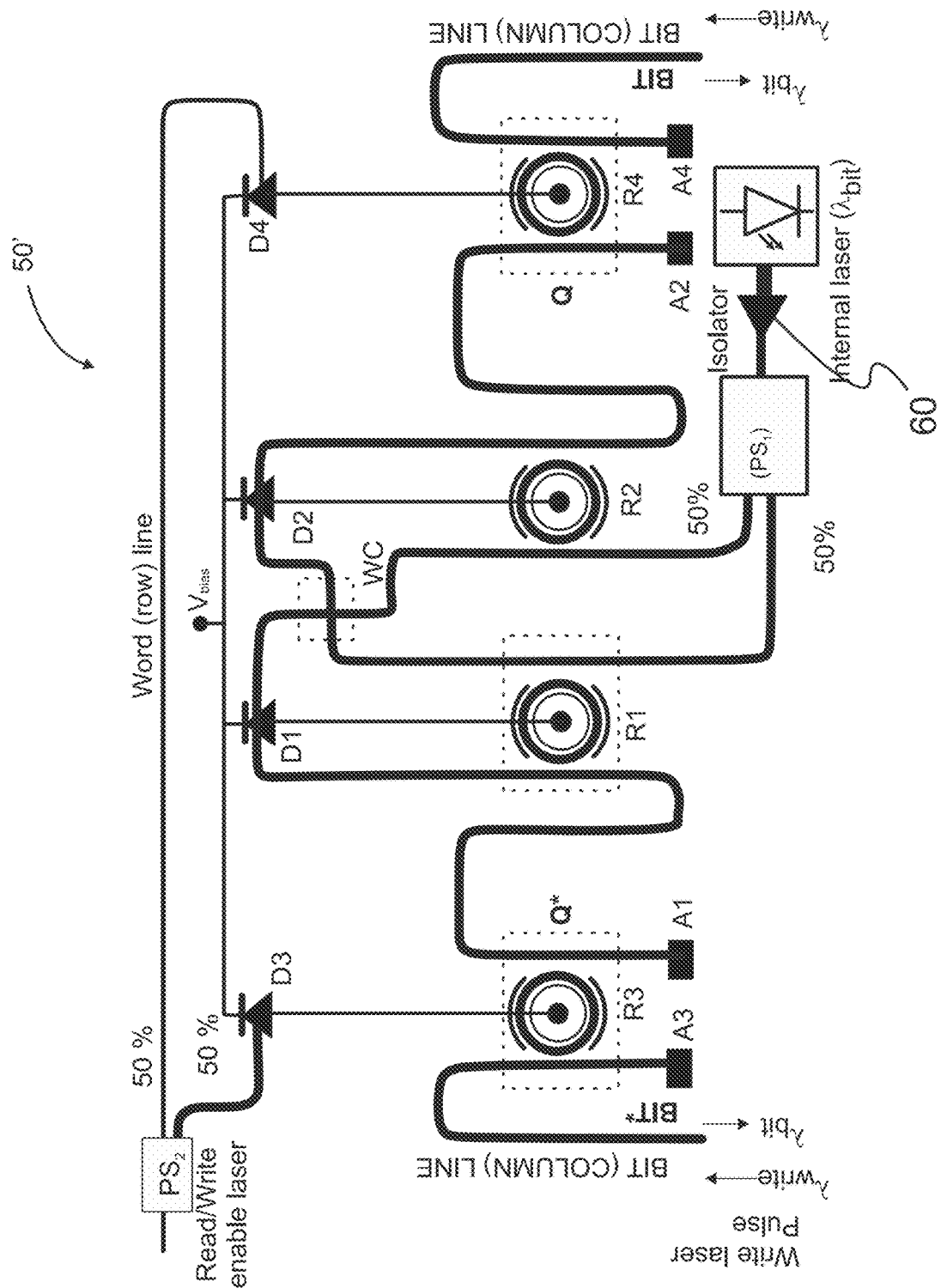
FIG. 12. Schematic of an O-SRAM cell.

FIGS. 10A and 12 provide schematics of a novel optical memory element based on cross-coupled optical devices—photodiodes (PDs) and microring resonator (MRR) modulators/switches. Furthermore, the data can be selectively written or read to/from the optical memory element through another set of PDs and MRRs enabling random access functionality. This, in turn, leads to the construction of optical SRAM with striking functional similarities to electrical SRAMs, including complementary data storage and differential read-out of data[11]. Furthermore, the optical-SRAM (O-SRAM) can be arranged in an array-like fashion for creating large-scale on-chip optical storage. Advantageously, the use of well-known optical devices makes these designs amenable to large-scale manufacturing in the existing silicon photonics foundry process.

With respect to FIGS. 10A and 12, schematics of an O-SRAM cell having ring resonators and photodiodes are provided. O-SRAM cells 50 and 50' include a first ring resonator R1 having a first ring resonator drop-port that represents a state Q* and a second ring resonator R2 having a second ring resonator drop-port that represents a state Q. A first photodiode D1 controls the first ring resonator R1 through the first waveguide W1. The ON state of first photodiode D1 implies that first ring resonator R1 is resonant to an input light having wavelength $\lambda_{bit}$ thereby transferring maximum optical power to the first ring resonator drop-port (resulting in a logic HIGH at Q* as described below). A second photodiode D2 controls the second ring resonator R2 through a second waveguide W2. The ON state of the second photodiode D2 implies that the second ring resonator R2 is resonant to the input light having wavelength $\lambda_{bit}$ thereby transferring maximum optical power to the second ring resonator drop-port, (resulting in a logic HIGH at Q as described below).

In a variation, when the first ring resonator R1 is resonant to the input light having wavelength $\lambda_{bit}$, light output at a first ring resonator through-port of the first ring resonator R1 is insufficient to turn ON the second photodiode D2, causing the second ring resonator R2 to be not in resonance with the input light having wavelength $\lambda_{bit}$ and when the second ring resonator R2 is resonant to the input light having wavelength $\lambda_{bit}$, the light output at a second ring resonator through-port of the second ring resonator R2 is insufficient to turn ON the first photodiode D1, causing the first ring resonator R1 to not be in resonance with the input light having wavelength $\lambda_{bit}$.

Referring to FIG. 10A, a read/write section includes a third ring resonator R3 and fifth ring resonator R5 controlled by third photodiode D3 and fourth ring resonator R4 and sixth ring resonator R6 controlled by fourth photodiode D4. In a further refinement, the read/write section remains OFF during a hold state unless the O-SRAM cell is accessed (or selected) for read/write operations by passing light through a 'wordline' waveguide.

In a variation of the cell of FIG. 10A, the O-SRAM cell is initialized by a write operation to ensure either Q=HIGH, Q*=LOW (digital 1) or Q=LOW, Q*=HIGH (digital 0) thereby obviating a condition in which Q and Q* can simultaneously be HIGH or LOW.

In a variation of the cell of FIG. 10A, the O-SRAM cell further includes a third photodiode D3, a fourth photodiode D4, and a 'wordline' waveguide that couple a read/write signal to the third photodiode D3 and the fourth photodiode D4. In a refinement, in order to read a state of the O-SRAM cell, the read/write signal received by the 'wordline' waveguide drives the third photodiode D3 and fourth photodiode D4 to an ON state thereby driving third ring resonator R3 and fourth ring resonator R4 are driven to be resonant to $\lambda_{bit}$ causing the state Q which is an input of the fourth ring resonator R4 and the state Q* which is an input of third ring resonator R3 to be transferred to a third ring resonator drop-port and a fourth ring resonator drop-port, respectively as differential optical outputs. In a further refinement, the differential optical outputs are then transferred to BIT and BIT* waveguides, which can then be fed to peripheral sensing circuits for reading stored data in the O-SRAM cell. In still another refinement, when the O-SRAM cell is initially in Q=LOW and Q*=HIGH state, the second photodiode D2 is in the OFF state and the second ring resonator R2 is off-resonant to $\lambda_{bit}$, while the first photodiode D1 is in the ON state and the first ring resonator R1 is in resonant to $\lambda_{bit}$. In a further refinement, a memory output state is flipped when the second photodiode D2 is triggered with an external optical signal. It still a further refinement, a write operation is initiated by activating third photodiode D3 and fourth photodiode D4 by providing the read/write signal in the 'wordline' waveguide. It still a further refinement, an external optical write pulse is then applied at a BIT waveguide, reaching the second photodiode D2 through sixth ring resonator R6 which is resonant to $\lambda_{write}$, thereby turning ON the second photodiode D2 and subsequently driving second ring resonator R2 in resonance to the input light having wavelength $\lambda_{bit}$. It still a further refinement, the second ring resonator R2 being resonant turns away light feeding the first photodiode D1 thereby turning the first photodiode D1 OFF and making first ring resonator R1 non-resonant to wavelength $\lambda_{bit}$ which keeps the second photodiode D2 in the ON state, leading to Q being HIGH and Q* being LOW.

Referring to FIG. 12, wherein a read/write section includes a third ring resonator R3 controlled by third photodiode D3 and fourth ring resonator R4 controlled by fourth photodiode D4. In a variation, the read/write section remains OFF during a hold state unless the O-SRAM cell is accessed (or selected) for read/write operations by passing light through a 'wordline' waveguide. In a refinement, the O-SRAM cell is initialized by a write operation ensure either Q=HIGH, Q*=LOW (digital 1) or Q=LOW, Q*=HIGH (digital 0) thereby obviating a condition in which Q and Q* can simultaneously be HIGH or LOW.

In a variation of the cell of FIG. 10A, the memory cell further includes a third photodiode D3 photodiode, a fourth photodiode D4, and a 'wordline' waveguide that couple a read/write signal to the third photodiode D3 and the fourth photodiode D4. In a refinement, in order to read a state of the O-SRAM cell, the read/write signal received by the 'wordline' waveguide drives the third photodiode D3 and fourth photodiode D4 to an ON state thereby driving third ring resonator R3 and fourth ring resonator R4 to be resonant to $\lambda_{bit}$ causing the state Q which is an input of the fourth ring resonator R4 and the state Q* which is an input of third ring resonator R3 to be transferred to a BIT* waveguides via a third ring resonator drop-port and to a BIT waveguide via a fourth ring resonator drop-port, respectively as differential optical outputs. In a further refinement, the O-SRAM cell is initially in Q=LOW and Q*=HIGH state, the second photodiode D2 is in the OFF state and the second ring resonator R2 is off-resonant to $\lambda_{bit}$, while the first photodiode D1 is in the ON state and the first ring resonator R1 is in resonant to $\lambda_{bit}$. In a further refinement, a memory output state is flipped, the second photodiode D2 is triggered with an external optical signal. In still a further refinement, a write operation is initiated by activating third photodiode D3 and fourth photodiode D4 by providing the read/write signal in the 'wordline' waveguide. In still a further refinement, an external optical write pulse is then applied at a BIT waveguide, reaching the second photodiode D2 through fourth ring resonator R4 which is resonant to $\lambda_{write}$, thereby turning ON the second photodiode D2 and subsequently driving the second ring resonator R2 in resonance to the input light having wavelength $\lambda_{bit}$. In still a further refinement, the second ring resonator R2 being resonant turns away light feeding the first photodiode D1 thereby turning the first photodiode D1 OFF and making first ring resonator R1 non-resonant to wavelength $\lambda_{bit}$ which keeps the second photodiode D2 in the ON state, leading to Q being HIGH and Q* being LOW.

In some variation, O-SRAM cell of FIGS. 10A and 12 can include an isolator 60 that blocks light input to the internal laser 64 as depicted in FIG. 12. This isolator can also be used in the LEO-RAM cells set forth above.

Figure 10B:
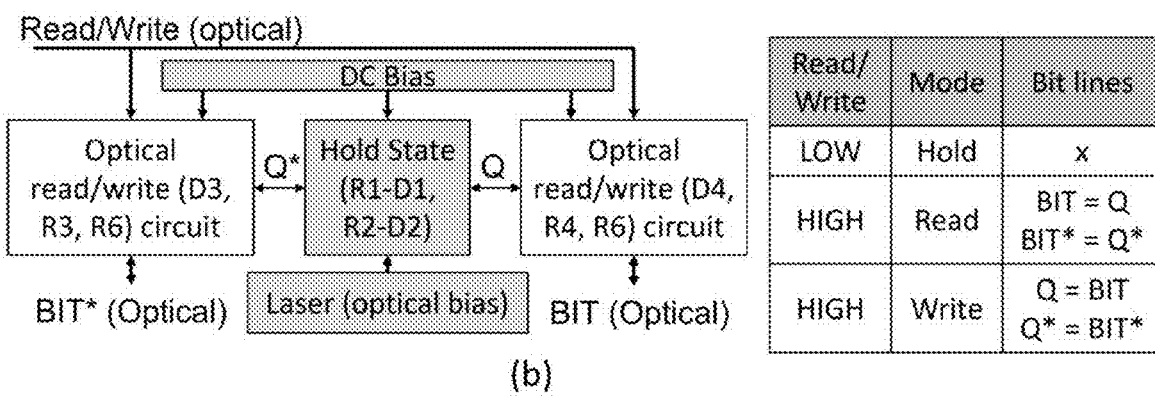
Figure 10C:
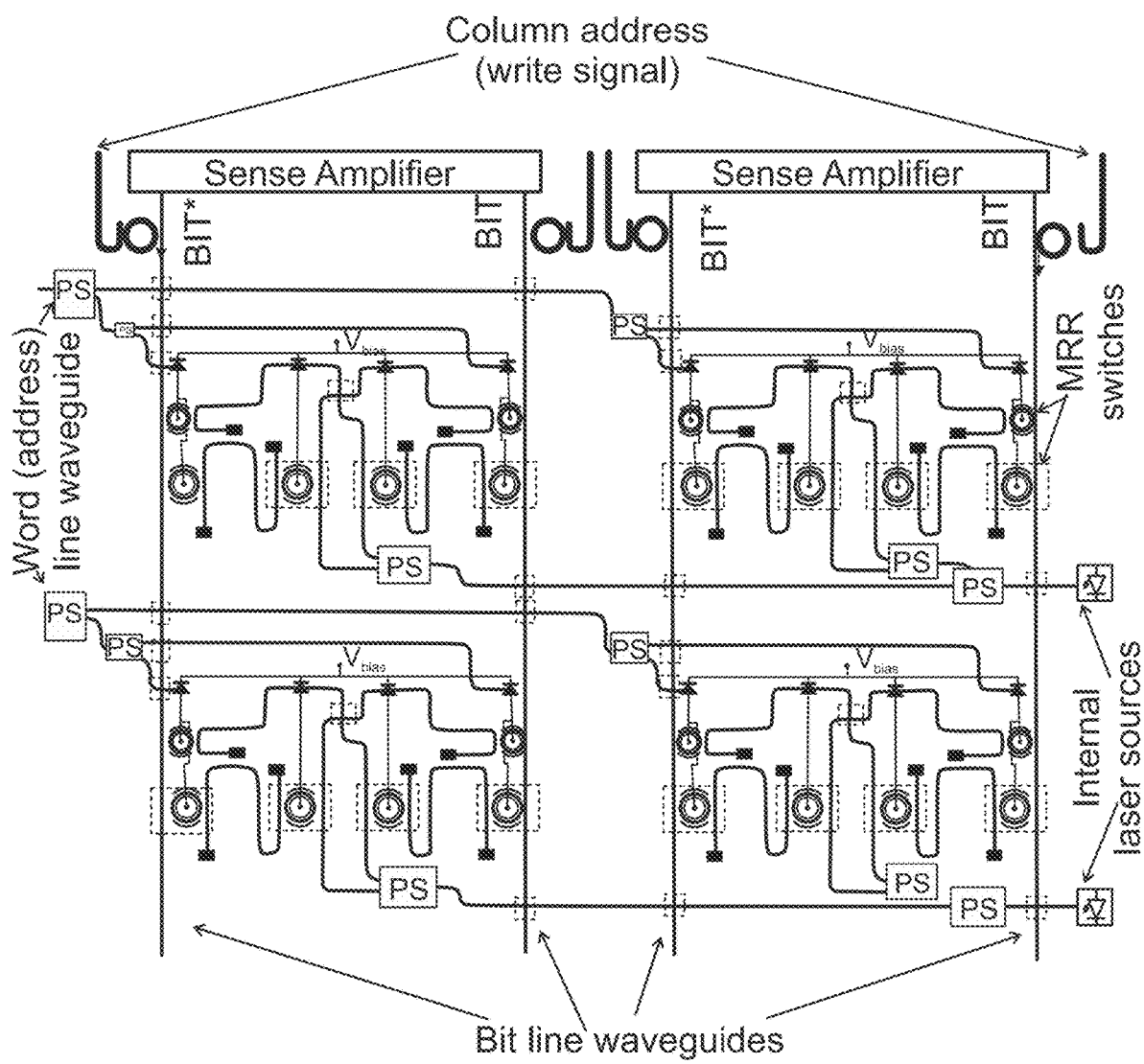

FIG. 10(A) shows the schematic layout of an example of the O-SRAM cell, where R1-R6 are MRR based active optical switches, D1-D4 are photodiodes (PDs) coupled to integrated optical waveguides, PS1-PS2 are optical power splitters, and A1-A8 are passive optical absorbers to reduce reflections from unwanted output ports. A block diagram representation of the O-SRAM is shown in FIG. 10(B) along with its truth table. The circuit is optically biased by an internal laser source (wavelength $\lambda_{bit}$) and electrically biased by a DC voltage source ($V_{bias}$). The MRR switches R1 and R2, and feedback photodiodes D1 and D2 form the internal optical latch. The optical outputs Q* and Q represents the present state of the memory. While the other MRRs (R3-R6) and PDs (D3 and D4) constitute the read/write access circuit. The MRR switches are designed on a high speed p-n (carrier depletion) phase shifters. Detailed working of the circuit is discussed below. The O-SRAM bit-cells can be arranged in a 2D array fashion, as shown in FIG. 10(C), by replicating the bit-cells in rows and columns for creating large-scale optical memory sub-system. The rows share 'wordline' waveguides, while columns share BIT and BIT* waveguides.

As shown in FIG. 10(A), the internal bias laser ($\lambda_{bit}$) is coupled to a 50:50 power splitter (PS1) that feeds two identical MRR switches, R1 and R2, which in turn are controlled by the corresponding feedback photodiodes D1 and D2, respectively. The through-port of R1 (R2) drives D2 (D1). The drop ports of R1 and R2 represent the output states Q* and Q respectively. The ON state of D1 implies that R1 is resonant to the input light at $\lambda_{bit}$ and transfers maximum optical power to its drop-port, resulting in a logic HIGH at Q*. This also implies that the light output at the through-port of R1 is insufficient to turn ON D2, causing R2 to be not in resonance with the incoming light. As a result, R2 delivers power to D1 and keeps the circuit in a stable state (Q*=HIGH and Q=LOW) by keeping R1 ON. This state continues as long as the electrical and optical bias signals are applied to the memory element allowing a static storage of optical data. Thus, the cross-coupled MRR-PD system (R1, D2 & R2, D1) forms an optical latch or optical storage unit constituting an optical SRAM bit cell. The read/write part of the O-SRAM cell (R3 and R5 controlled by D3 & R4 and R6 controlled by D4) remains OFF during the hold state unless the O-SRAM cell is accessed (or selected) for read/write operation by passing light through the 'wordline' waveguide. Note, the O-SRAM would be initialized by a write operation (described below) to ensure either Q=HIGH, Q*=LOW (digital 1) or Q=LOW, Q*=HIGH (digital 0). Thus, the condition that Q and Q* can simultaneously be HIGH or LOW is obviated (similar to electrical-SRAMs that have a metastable state but are never encountered in normal memory operations).

In order to read the state of the memory, a read/write laser is first enabled in the 'wordline' waveguide. This first drives D3 and D4 to the ON state; subsequently R3 and R4 are driven in resonant to $\lambda_{bit}$ (MRRs R1-R4 are identical). Thus, the Q (input of R4) and Q* (input of R3) will transfer to the drop ports of R3 and R4, respectively. This differential (complementary) optical outputs are then transferred to BIT and BIT* waveguides (R5 and R6 are designed to be non-resonant to $\lambda_{bit}$ irrespective of the switching voltage), which can then be fed to the peripheral sensing circuits for reading the stored data in the O-SRAM bit-cell.

To understand the memory write operation, assume the memory is initially in Q=LOW and Q*=HIGH state. This means that D2 is in OFF state and R2 is off-resonant to $\lambda_{bit}$, while D1 is in ON state and R1 is in resonant to $\lambda_{bit}$. In order to flip the memory output state, D2 needs to be triggered with an external optical signal. The write operation is initiated by activating D3-D4 photodiodes by enabling the READ/WRITE laser in the 'wordline'. An external optical write pulse (at λwa) is then applied at the BIT waveguide, reaching D2 through R6 (resonant to $\lambda_{write}$). This process turns ON D2 and subsequently drives R2 in resonance to $\lambda_{bit}$. The resonant R2, turns away the light feeding D1 from its through-port to the drop port. In other words, D1 turns OFF and makes R1 non-resonant to $\lambda_{bit}$. This keeps D2 in ON state, leading to Q=HIGH and Q*=LOW, i.e., the state of the memory has switched as dictated by the write operation.

From the above discussion, it is clear that the write operation involves more numbers of MRRs and PDs compared to the read operation ($t_{write} > t_{read}$), and thus the overall speed (or bandwidth) of the memory is specified in terms write speed. The operating speed of our proposed O-SRAM is limited by the bandwidths of MRRs ($BW_{MRR}$) and PDs ($BW_{PD}$) used in the circuit. In general, the MRR bandwidth is expressed using the empirical formula $1/BW_{MMR}^2 = 1/BW_Q^2 + 1/BW_{RC}^2$ where $BW_Q = (2\pi\tau_Q)^{-1}$ is a function of cavity photon life time $\tau_Q$ and $BW_Q = (2\pi RC)^{-1}$ is a function of RC($=\tau_{RC}$) time constant of the phase shifter[12]. At any operating λ and a given quality factor Q, $\tau_Q$ can be expressed as $\tau_Q = \lambda Q/(2\pi c)$ where, c is the light speed in vacuum. The Q-factor is a critical design parameter of an MRR switch. The optical bandwidth BWQ reduces as Q increases. On the other hand, the photon interaction with the injected/depleted carriers reduces as Q($\tau_Q$) reduces, and thus large bias voltage is required to switch the MRR between non-resonance to resonance. Thus, a moderate Q factor ~5000-7000 is preferred for our design, providing a BW~30 GHz to 50 GHz at operating λ~1270 nm. The phase shifter delay, $\tau_{RC}$, is relatively smaller for carrier depletion (p-n) type phase-shifter compared to carrier injection (p-i-n) type phase-shifter[13]. This is because p-i-n devices take additional time delay to sweep out the injected carriers from the intrinsic (i-) region after removing the bias voltage across the junction.

Figure 4B:
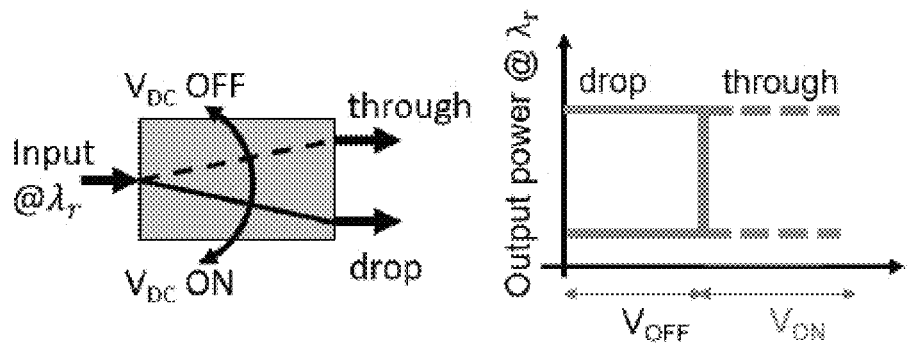

We adapted the ring with SOI waveguide of 300 nm×400 nm, ring radius=10 μm. The waveguide loss, effective index versus bias voltage) and phase-shifter (p-n type) design parameters were adapted as reported in[14] and designed our add-drop MRR switches near λ=1270 nm. A schematic of the add-drop MRR switch driven by a PD is shown in FIG. 5(A). A detailed working principle of MRR switches/modulators can be found elsewhere[12,15-17]. We carefully designed the coupling coefficients ($k_{1,2}$) between the ring and bus waveguides for a desired optical switching response at operating wavelength 1, with the following assumptions: (1) the drop port extinction ratio, $ER_{dr} = |P_{dr}^{ON} - p_{dr}^{OFF}| \geq 3$ dB (where $P_{dr}^{ON,OFF}$ are the drop-port power for the ON and OFF states of MRR) for differential sensing between the BIT and BIT* outputs, (2) through-port extinction ratio, $ER_{th} = |P_{th}^{OFF} - p_{th}^{ON}| \geq 20$ dB (where $P_{th}^{ON,OFF}$ are the through-port power for the ON and OFF states of MRR) for better stability (either R1 or R2 is in ON state at any time during the memory operation), and (3) $P_{th}^{ON}$ is negligibly small to keep the corresponding PD in dark current mode (OFF state). FIG. 4(A) shows the transmission characteristics at the through-port ($P_{th}$) and drop-port ($P_{dr}$) of the MRR switch (R1-R4) for OFF ($V_{ps} = 0$ V) and ON ($V_{ps}^{ON} = -4$ V) states of the phase shifter ($V_{ps}$ is the reverse bias voltage across the p-n phase shifter). The resonance wavelength (lOFF r) is shifted by $\Delta\lambda = 117$ pm to $\lambda_r^{ON} \sim 1270.06$ nm, with $ER_{th} \approx 23$ dB and $ER_{dr} \approx 4:4$ dB. The Q factor ($=\lambda_r/\delta\lambda^{3\ dB}$, where $\delta\lambda^{3\ dB}$ is 3-dB band width) of the spectrum is ≈6500, which results in $\tau_Q \approx 4:38$ ps and $BW_Q \approx 36$ GHz. We choose the operating wavelength ($\lambda_{bit} = 1270.08$ nm) slightly above $\lambda_R^{ON}$ in order to have smooth transition at the output ports and also to satisfy the above conditions. The switching characteristics at $\lambda_{bit}$ is shown in FIG. 4(B). The Q-limited rise time at the drop port and fall time at the through-port are calculated to be $\tau_r^{dr} \sim 29.5$ ps and $\tau_f^{th} \sim 14$ ps, respectively. In this case, the RC limited electrical band width of the phase shifter ($BW_{RC} \sim 150$ GHz[14]) is much higher than that of ring resonator ($BW_Q$). As discussed earlier, R1-R4 are identical MRRs of radii 10 μm operating at $\lambda_{bit}$. Similarly, R5 and R6 are identical MRRs of radii 11.2 μm, designed to operate at resonant wavelength $\lambda_{write} \sim 1269.7$ nm.

Besides the bandwidth, it is also important to consider reverse saturation current Is of the p-n phase shifter. For the given parameters in[14], Is is calculated to be ~4-10 nA. Since the MRR and PD are connected in series, one must choose a PD with the dark current $I_{dark} \ll I_s$, in order to avoid the inadvertent switching of the MRR due to dark current while the corresponding PD is OFF. For D1-D4, we choose the Ge based photodiode[18] with a low dark current of ~30 pA (<<Is), responsivity R=0.043 A/W and operating speed of ~14.5 GHz at λ~1.27 μm.

We have simulated and verified the memory operations in Lumerical Interconnect. The simulated memory write operation at different data rates (5 Gbps, 18 Gbps and 20 Gbps) are shown in FIGS. 11 (A)-(C) and corresponding eye-diagrams (calculated at Q output) in (d)-(f). The input non-return to zero (NRZ) write signal and the corresponding memory states (Q and Q* outputs) are shown for comparison. Note that, the outputs reach stable states within the pulse period when operating at low data rates, for example, at 5 Gbps as shown in FIG. 11 (A). The corresponding rise-time (10%-90%) and fall-time (90%-10%) are calculated as $t_r \sim 46$ ps and $t_f \sim 43$ ps, respectively. This means that, the maximum operating speed of the O-SRAM cell is expected to be $1/t_r \approx 22$ Gbps. However, given the frequency response of the PD, at higher data rate the outputs of the photodiodes do not reach its maximum value and hence MRRs, that are driven by PDs, operate at slightly lower bias voltage, which in turn changes the operating conditions (i.e, $\Delta\lambda$, $ER_{dr}$, $ER_{th}$, etc.). Thus, the actual operating speed of the memory is slightly lower than the calculated value of $1/t_r \approx 22$ Gbps. Through simulations, we noticed that the output states (Q and Q*) are distinguishable with clear eye opening when the memory operates ≤20 Gbps (NRZ). This has been shown in FIGS. 11(B) & (E) for 18 Gbps and (C) & (F) for 20 Gbps. Thus, the maximum speed of the memory is ~20 Gbps. It is worth mentioning, that these initial simulations are based on published literature for photodiodes[18] and MRR modulators[14] that have been optimized for telecommunication applications. The preliminary speed, required bias voltage and other metrics are, therefore limited by the reported device metrics. Significant improvements can be achieved by device optimization of MRRs and PDs designed specifically for memory storage.

TABLE I

Performance comparison of various integrated optical-SRAMs.

| | | Energy efficiency (pJ/bit) | | | | |
| | Speed | Static | | Switching | | Footprint |
| Device | (Gbps) | Elec. | Opt. | Elec. | Opt. | ($\mu m^2$) |
|---|---|---|---|---|---|---|
| SOA-MZIS[4, 5] | 5 | 120 | — | — | 0.6 | 540 × 10$^6$ |
| SOA-MZIS[6] | 5 | 120 | — | — | 3 | 12 × 10$^6$ |
| SOA-MZIS[7] | 10 | 180 | — | — | 0.5 | 12 × 10$^6$ |
| SOA-Ring laser[8] | 1 | — | — | — | — | 475 × 400* |
| Photonic cyrstal[9] | 10 | — | 0.01 | — | 0.028 | 6.2* |
| Optomechanic[10] | 8 | — | — | — | — | 100 × 100* |
| This work** | 20 | 2.5e−6 | 1.67e−5 | 1.04 | 3.5xe−5 | 60 × 40 |

**The reported switching speed and energy are based on simulation parameters from published literature for photodiodes[18] and MRR modulators[14].
*Flip flop only.

Table I shows the comparison of performances of various optical SRAMs reported in the literature. The static energy consumption of our device is estimated as $V_{bias} \times (I_s + 3I_{dark}) \times t_{bit} \approx 2.5$ aJ/bit, where we assume only one of the PD is ON, and the remaining are OFF at any time during the static operation. Similarly, the static optical energy is calculated as the fraction of internal laser power ($P_{laser}$) to the memory speed. With the given PD parameters, we calculated the minimum optical input power to the PD (say D1) as ≈100 nW which ensures the MRR (say R1) is in ON state. This corresponds to total internal laser power, $P_{laser}$=334 nW, considering the power associated with 3-dB power splitter PS1 (refer FIG. 10) and the transfer function of MRR (R1 or R2) from FIG. 4(A). Thus, the static optical energy consumption is ~16.7 aJ/bit. Since all six MRRs are involved in the write operations, the dynamic electrical energy consumption is $6 \times CV_{bias}^2/4 = 1.04$ pJ/bit, where C=45 fF[14]. Similarly, the dynamic optical energy is the sum of all three lasers involved in the operation, i.e., internal laser source, write/read enable laser, and write laser. This is calculated as ~40 aJ/bit. Note, the estimated power budget does not include energy needed for thermal detuning of the MRRs. In general, the MRR operating wavelength is detuned using thermal phase-shifters to compensate for any wavelength shift due to process variations[14,19]. Such thermal detuning could be implemented on global (for all MRRs in a memory array) or local (for individual MRRs) level based on the scale and nature of process variations associated with specific manufacturing technology.

In conclusion, an OSRAM cell using cross-coupled MRRs and PDs has been designed and simulated. The performance of the proposed memory is simulated based on published literature for MRR modulators[14] and PDs[18]. The operating speed and static (switching) energy consumption are estimated as 20 Gb/s and ~16.7 aJ/bit (~1.04 pJ/bit), respectively. The overall footprint of the device is ~2400 $\mu m^2$. Finally, advantages of the OSRAM include: 1) the proposed optical memory is amenable to largescale manufacturing in existing silicon photonics foundry process without need of explicit material/process modifications, 2) since optical signals can travel long distances with minimal loss, the O-SRAM bit-cell can be replicated along rows and columns to create very-large scale, ultra-high speed memory arrays, 3) the functional similarity of proposed O-SRAM with electrical SRAM opens up new pathways to implement emerging paradigms of in-memory and near-memory computing, similar to their electrical counterparts, within large-scale optical memory arrays. Thus, the O-SRAM bit-cell can be used to create ultra-fast, ultra-large scale on-chip memory system—a key component required for achieving the holy grail of general purpose optical computing.

Additional details for O-SRAM bit-cell are found in arXiv:2111.13682 [physics.app-ph] or arXiv:2111.13682v1 [physics.app-ph] (https://doi.org/10.48550/arXiv.2111.13682); the entire disclosures of which are hereby incorporated reference in their entirety.

3. Fabrication of Memory Cells

Figure 13:
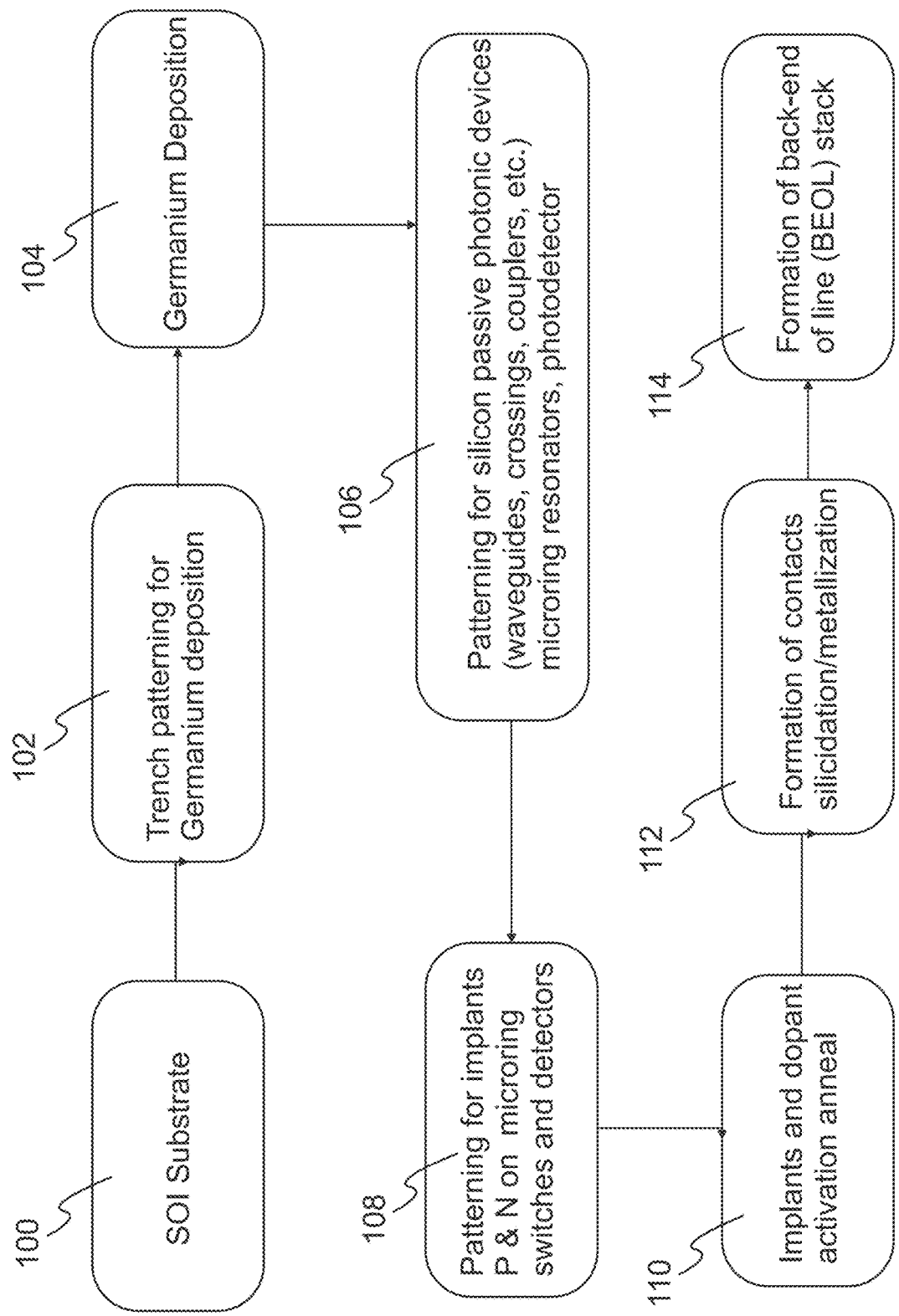
FIG. 13. Flow chart illustrating a method for fabricating the memory cells set forth above.

FIG. 13 provides a flow chart illustrating a method for fabricating the memory cells set forth above. In particular, this method can be used to fabricate the LEO-RAM cell of FIGS. 1-9 and the O-SRAM cell of FIGS. 10 to 12. In step 100), a silicon-on-insulator is provided. In step 102), trench patterning for Germanium deposition. In step 104), a layer of germanium is deposited. In step 106, patterning is performed for silicon passive photonic devices (waveguides, crossings, couplers, etc.) microring resonators, photodetector. In step 108), patterning is performed for implants P and N doped regions the on microring switches and detectors. In step 110), the implants and dopants are activated by annealing. In step 112), contacts are formed by silicidation/metallization. In step 114), back-end of line (BEOL) stack is formed.

Figure 14:
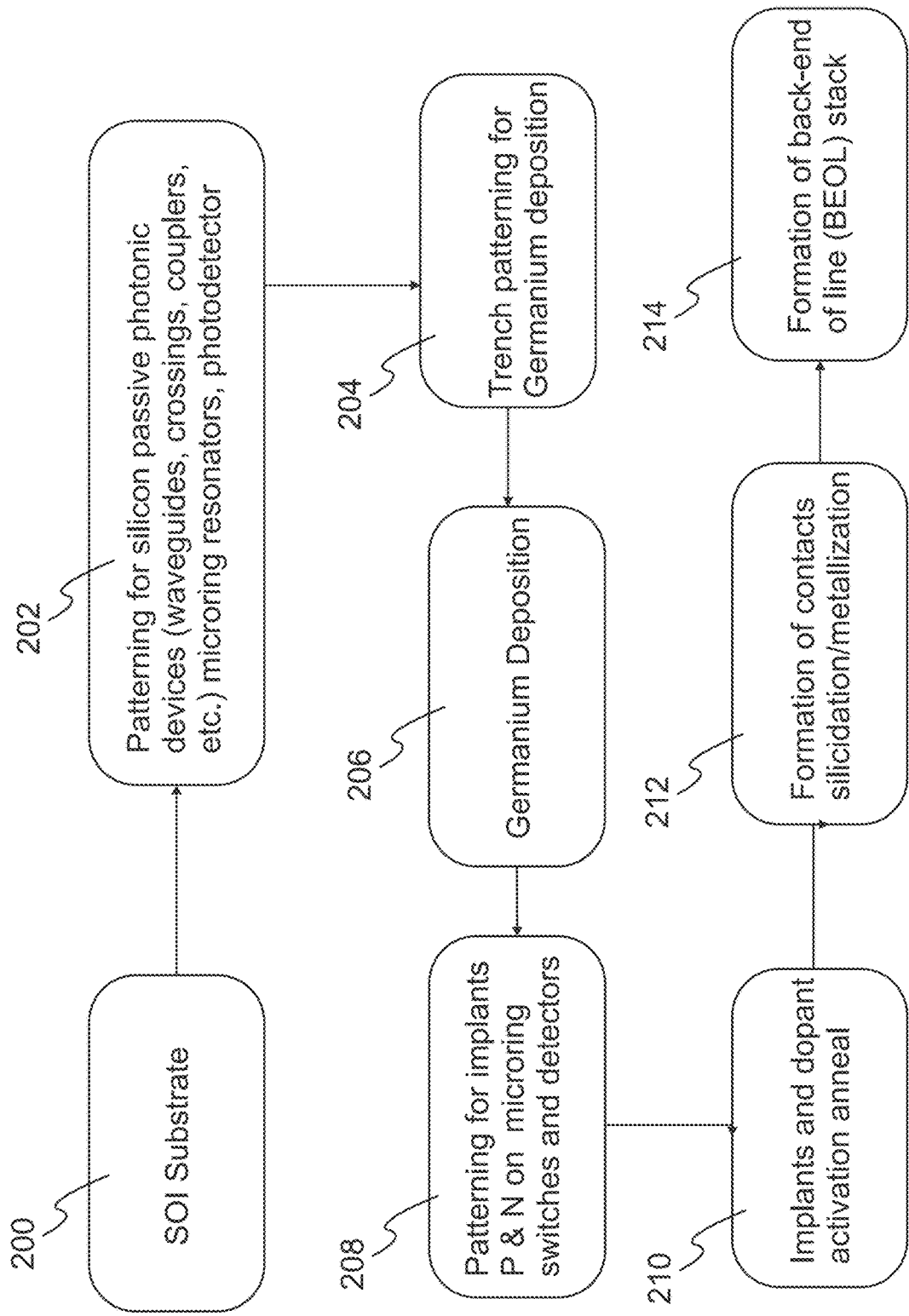
FIG. 14. Flow chart illustrating a method for fabricating the memory cells set forth above.

FIG. 14 provides a flow chart illustrating a method for fabricating the memory cells set forth above. In particular, this method can be used to fabricate the LEO-RAM cell of FIGS. 1-9 and the O-SRAM cell of FIGS. 10 to 12. In step 200), a silicon-on-insulator is provided. In step 202), patterning for silicon passive photonic devices (waveguides, crossings, couplers, etc.) microring resonators, photodetector is performed. In step 204), trench patterning for Germanium deposition is performed. In step 206), germanium is deposited. In step 208), patterning is performed for implants P and N doped regions the on microring switches and detectors. In step 210), the implants and dopants are activated by annealing. In step 212), contacts are formed by silicidation/metallization. In step 214), back-end of line (BEOL) stack is formed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

1. W. Bogaerts, P. De Heyn, T. Van Vaerenbergh, K. De Vos, S. Kumar Selvaraja, T. Claes, P. Dumon, P. Bienstman, D. Van Thourhout, and R. Baets, "Silicon microring resonators," Laser & Photonics Rev. 6, 47-73 (2012).
2. R. Soref and B. Bennett, "Electro-optical effects in silicon," IEEE journal quantum electronics 23, 123-129 (1987).
3. Q. Xu, B. Schmidt, S. Pradhan, and M. Lipson, "Micrometre-scale silicon electro-optic modulator," nature 435, 325-327 (2005).
4. Y. Liu, R. McDougall, M. Hill, G. Maxwell, S. Zhang, R. Harmon, F. Huijskens, L. Rivers, H. Dorren, and A. Poustie, "Packaged and hybrid integrated all-optical flip-flop memory," Electronics Letters 42, 1399-1400 (2006).
5. N. Pleros, D. Apostolopoulos, D. Petrantonakis, C. Stamatiadis, and H. Avramopoulos, "Optical static RAM cell," IEEE Photonics Technology Letters 21, 73-75 (2008).
6. S. Pitris, C. Vagionas, T. Tekin, R. Broeke, G. Kanellos, and N. Pleros, "WDM-enabled optical RAM at 5 Gb/s using a monolithic inp flip-flop chip," IEEE Photonics Journal 8, 1-7 (2016).
7. A. Tsakyridis, T. Alexoudi, A. Miliou, N. Pleros, and C. Vagionas, "10 Gb/s optical random access memory (RAM) cell," Optics Letters 44, 1821-1824 (2019).
8. B. Li, M. I. Memon, G. Mezosi, Z. Wang, M. Sorel, and S. Yu, "Optical static random access memory cell using an integrated semiconductor ring laser," in 2009 International Conference on Photonics in Switching (IEEE, 2009) pp. 1-2.
9. T. Alexoudi, D. Fitsios, A. Bazin, P. Monnier, R. Raj, A. Miliou, G. T. Kanellos, N. Pleros, and F. Raineri, "II-V-on-Si photonic crystal nanocavity laser technology for optical static random access memories," IEEE Journal of Selected Topics in Quantum Electronics 22, 295-304 (2016).
10. B. Dong, H. Cai, Y. Gu, Z. Yang, Y. Jin, Y. Hao, D. Kwong, and A. Liu, "Nano-optomechanical static random access memory (SRAM)," in 2015 28th IEEE International Conference on Micro Electro Mechanical Systems (MEMS) (IEEE, 2015) pp. 49-52.
11. R. Mathur, M. Bhargava, S. Salahuddin, P. Schuddinck, J. Ryckaert, S. Annamalai, A. Gupta, Y. Chong, S. Sinha, B. Cline, et al., "Buried bitline for sub-5 nm sram design," in 2020 IEEE International Electron Devices Meeting (IEDM) (IEEE, 2020) pp. 20-2.
12. P. Dong, S. Liao, D. Feng, H. Liang, D. Zheng, R. Shafiiha, C.-C. Kung, W. Qian, G. Li, X. Zheng, et al., "Low Vpp, ultralow-energy, compact, highspeed silicon electro-optic modulator," Optics Express 17, 22484-22490 (2009).
13. R. Soref and B. Bennett, "Electrooptical effects in silicon," IEEE Journal of Quantum Electronics 23, 123-129 (1987).
14. J. Sun, R. Kumar, M. Sakib, J. B. Driscoll, H. Jayatilleka, and H. Rong, "A 128 Gb/s pam4 silicon microring modulator with integrated thermo-optic resonance tuning," Journal of Lightwave Technology 37, 110-115 (2019).
15. W. Bogaerts, P. De Heyn, T. Van Vaerenbergh, K. De Vos, S. Kumar Selvaraja, T. Claes, P. Dumon, P. Bienstman, D. Van Thourhout, and R. Baets, "Silicon microring resonators," Laser & Photonics Reviews 6, 47-73 (2012).
16. G. T. Reed, G. Mashanovich, F. Y. Gardes, and D. Thomson, "Silicon optical modulators," Nature Photonics 4, 518-526 (2010).
17. Q. Xu, B. Schmidt, S. Pradhan, and M. Lipson, "Micrometre-scale silicon electro-optic modulator," Nature 435, 325-327 (2005).
18. M. de Cea, D. Van Orden, J. Fini, M. Wade, and R. J. Ram, "High-speed, zero-biased silicon-germanium photodetector," APL Photonics 6, 041302 (2021).
19. K. Padmaraju and K. Bergman, "Resolving the thermal challenges for silicon microring resonator devices," Nanophotonics 3, 269-281 (2014

What is claimed is:
1. A LEO-RAM cell comprising:
a first ring resonator R1 that couples a first waveguide W1 to a second waveguide W2 such that the first waveguide W1 receives a first optical signal S1,
a second ring resonator R2 that couples a third waveguide W3 to a fourth waveguide W4 such that the third waveguide W3 receives a second optical signal S2;
a first phototransistor T1 having a base (or gate) coupled to an output of the second ring resonator R2 through the third waveguide W3 and is configured to operate the first ring resonator R1 wherein the first ring resonator R1 is configured to operate at a first resonant wavelength $\lambda_{bit}$ when the first phototransistor T1 is OFF such that light output appears at a drop port of the first ring resonator R1 thereby switching second phototransistor T2 "ON" and configured to operate at non-resonant for $\lambda_{bit}$ when the first phototransistor T1 is "ON" such that second phototransistor T2 turns "OFF"; and
a second phototransistor T2 having a base (or gate) coupled to an output of the first ring resonator R1 through the second waveguide W2 and is configured to operate the second ring resonator R2; wherein the second ring resonator R2 is configured to operate at same resonant wavelength $\lambda_{bit}$ when the second phototransistor T2 is "ON" such that when second ring resonator R2 is at resonance, no light will transfer to first phototransistor T1.

2. The LEO-RAM cell of claim 1 further comprising:
a third ring resonator R3 that couples a BIT* waveguide W5 to the first waveguide W1;
a fourth ring resonator R4 that couples a BIT waveguide W6 to the fourth waveguide W4;
a third phototransistor T3 having its base (or gate) coupled to a first Read/Write light signal S3 via a ninth waveguide W9 and configured to activate the third ring resonator R3 and is configured to operate the third ring resonator R3; and a fourth phototransistor T4 having its base (or gate) coupled to a second Read/Write light signal S4 via a tenth waveguide W10 and is configured to operate the fourth ring resonator R4, wherein the third ring resonator R3 and the fourth ring resonator R4 are configured for read operations when the third phototransistor T3 and the fourth phototransistor T4 are ON.

3. The LEO-RAM cell of claim 2, wherein the first phototransistor T1, the second phototransistor T2, the third phototransistor T3, and the fourth phototransistor T4 are each independently composed of silicon, germanium or combinations thereof.

4. The LEO-RAM cell of claim 2 wherein the third ring resonator R3 and the fourth ring resonator R4 are configured to operate at resonant to same wavelength $\lambda_{bit}$ as the first ring resonator R1 and the second ring resonator R2.

5. The LEO-RAM cell of claim 2 further comprising:
a fifth ring resonator R5 coupled to the first phototransistor T1; and
a sixth ring resonator R6 coupled to the second phototransistor T2, the fifth ring resonator R5 is controlled by third phototransistor T3 and the sixth ring resonator R6 is controlled by fourth phototransistor T4 wherein the fifth ring resonator R5 and the sixth ring resonator R6 are resonant to a different wavelength, a $\lambda_{write}$ signal being sent to the LEO-RAM cell through a BIT* waveguide W5 or a BIT waveguide W6.

6. The LEO-RAM cell of claim 5, wherein the fifth ring resonator R5 couples the BIT* waveguide W5 to a seventh waveguide W7 which is coupled to a seventh ring resonator R7 which is coupled to the first phototransistor T1.

7. The LEO-RAM cell of claim 6, wherein the sixth ring resonator R6 couples the BIT waveguide W6 to an eight waveguide W8 which is coupled to an eighth ring resonator R8 which is coupled to the second phototransistor T2.

8. The LEO-RAM cell of claim 7, wherein the fifth ring resonator R5, the sixth ring resonator R6, the seventh ring resonator R7, and the eighth ring resonator R8 are used for write operations.

9. The LEO-RAM cell of claim 8, wherein the first ring resonator R1, the second ring resonator R2, the third ring resonator R3, and the fourth ring resonator R4 the fifth ring resonator R5, the sixth ring resonator R6, the seventh ring resonator R7, the eighth ring resonator R8 are each independently composed of silicon, germanium or combinations thereof.

10. The LEO-RAM cell of claim 6, wherein when phototransistor T3 (or phototransistor T4) is ON, a $\lambda_{write}$ signal in the BIT*waveguide W5 (or the BIT waveguide W6) is transferred to a corresponding drop port of fifth ring resonator R5 (or the sixth ring resonator R6) thereby reaching an input of the seventh ring resonator R7 (or ring resonator R8) and wherein the seventh ring resonator R7 (or the ring resonator R8) are passive MRRs designed to operate at resonant wavelength $\lambda_{write}$.

11. The LEO-RAM cell of claim 10 wherein when third phototransistor T3 (or the fourth phototransistor T4) is ON, the $\lambda_{write}$ signal reaching to the base of the first phototransistor T1 (or second phototransistor T2) through the seventh ring resonator R7 (or eighth ring resonator R8) which is applied to the BIT* waveguide W5 (or the BIT waveguide W6).

12. The LEO-RAM cell of claim 1, wherein the LEO-RAM cell is fabricated on a substrate composed of a semiconductor, a dielectric, or combinations thereof.

13. The LEO-RAM cell of claim 12, wherein the substrate is composed of silicon, silicon nitride, aluminum nitride, sapphire, zinc oxide, or combinations thereof.

14. The LEO-RAM cell of claim 12, wherein the substrate is a semiconductor wafer.

15. The LEO-RAM cell of claim 14, wherein the semiconductor wafer is composed of silicon, germanium, III-V semiconductors, II-VI semiconductors, or combinations thereof.

16. The LEO-RAM cell of claim 1, wherein active photonics components are composed of silicon, germanium or combinations thereof.

17. The LEO-RAM cell of claim 1, further comprising a microring resonator thermal heater for wavelength reconfiguration.

18. The LEO-RAM cell of claim 1, configured to operate in a range of wavelengths, and in particular communication wavelength of 1.3 or 1.5 um.

19. A method for fabricating the LEO-RAM cell of claim 1, the method comprising:
a) providing a silicon-on-insulator;
b) patterning trenches for germanium deposition;
c) depositing a layer of germanium;
d) patterning for silicon passive photonic devices;
e) patterning is performed for implants P and N doped regions on microring switches and detectors;
f) annealing implants and dopants;
g) forming contacts by silicidation and/or metallization; and
h) forming a back-end of line (BEOL) stack.

20. A method for fabricating the LEO-RAM cell of claim 1, the method comprising:
a) providing a silicon-on-insulator;
b) patterning for silicon passive photonic devices
c) patterning trenches for germanium deposition;
d) depositing a layer of germanium;
e) patterning for implants of P and N doped regions for microring switches and detectors;
f) annealing implants and dopants;
g) forming contacts by silicidation and/or metallization; and
h) forming a back-end of line (BEOL) stack.

21. A photonics device including the LEO-RAM cell of claim 1 including components composed of silicon dioxide, silicon, silicon nitride, aluminum nitride, indium gallium arsenide, other III-V semiconductor materials, polymers, or combinations thereof.

22. An O-SRAM cell comprising:
a first ring resonator R1 having a first ring resonator drop-port that represents a state Q*;
a second ring resonator R2 having a second ring resonator drop-port that represents a state Q;
a first photodiode D1 that controls the first ring resonator R1 through first waveguide W1; wherein the ON state of first photodiode D1 implies that first ring resonator R1 is resonant to an input light having wavelength $\lambda_{bit}$ thereby transferring maximum optical power to the first ring resonator drop-port; and
a second photodiode D2 that controls the second ring resonator R2 through a second waveguide W2, wherein the ON state of second photodiode D2 implies that the second ring resonator R2 is resonant to the input light having wavelength $\lambda_{bit}$ thereby transferring maximum optical power to the second ring resonator drop-port.

23. The O-SRAM cell of claim 22 wherein when the first ring resonator R1 is resonant to the input light having wavelength $\lambda_{bit}$, light output at a first ring resonator through-port of the first ring resonator R1 is insufficient to turn ON the second photodiode D2, causing the second ring resonator R2 to be not in resonance with the input light having wavelength $\lambda_{bit}$ and when the second ring resonator R2 is resonant to the input light having wavelength $\lambda_{bit}$, the light output at a second ring resonator through-port of the second ring resonator R2 is insufficient to turn ON the first photodiode D1, causing the first ring resonator R1 to not be in resonance with the input light having wavelength $\lambda_{bit}$.

24. The O-SRAM cell of claim 23 wherein a read/write section includes a third ring resonator R3 and fifth ring resonator R5 controlled by third photodiode D3 and fourth ring resonator R4 and sixth ring resonator R6 controlled by fourth photodiode D4.

25. The O-SRAM cell of claim 24, wherein the read/write section remains OFF during a hold state unless the O-SRAM cell is accessed (or selected) for read/write operations by passing light through a 'wordline' waveguide.

26. The O-SRAM cell of claim 25, wherein the O-SRAM cell is initialized by a write operation ensure either Q=HIGH, Q*=LOW (digital 1) or Q=LOW, Q*=HIGH (digital 0) thereby obviating a condition in which Q and Q* can simultaneously be HIGH or LOW.

27. The O-SRAM cell of claim 25 further comprising:
a third photodiode D3;
a fourth photodiode D4; and
a 'wordline' waveguide that couple a read/write signal to the third photodiode D3 and the fourth photodiode D4.

28. The O-SRAM cell of claim 27 wherein in order to read a state of the O-SRAM cell, the read/write signal received by the 'wordline' waveguide drives the third photodiode D3 and the fourth photodiode D4 to an ON state thereby driving third ring resonator R3 and the fourth ring resonator R4 are driven to be resonant to $\lambda_{bit}$ causing the state Q which is an input of the fourth ring resonator R4 and the state Q* which is an input of third ring resonator R3 to be transferred to a third ring resonator drop-port and a fourth ring resonator drop-port, respectively as differential optical outputs.

29. The O-SRAM cell of claim 28 wherein the differential optical outputs are then transferred to BIT and BIT* waveguides, which can then be fed to peripheral sensing circuits for reading stored data in the O-SRAM cell.

30. The O-SRAM cell of claim 29 wherein when the O-SRAM cell is initially in Q=LOW and Q*=HIGH state, the second photodiode D2 is in the OFF state and the second ring resonator R2 is off-resonant to $\lambda_{bit}$, while the first photodiode D1 is in the ON state and the first ring resonator R1 is in resonant to $\lambda_{bit}$.

31. The O-SRAM cell of claim 30, wherein a memory output state is flipped when the second photodiode D2 is triggered with an external optical signal.

32. The O-SRAM cell of claim 31, wherein a write operation is initiated by activating third photodiode D3 and the fourth photodiode D4 by providing the read/write signal in the 'wordline' waveguide.

33. The O-SRAM cell of claim 32, wherein an external optical write pulse is then applied at a BIT waveguide, reaching the second photodiode D2 through sixth ring resonator R6 which is resonant to $\lambda_{write}$, thereby turning ON the second photodiode D2 and subsequently driving second ring resonator R2 in resonance to the input light having wavelength $\lambda_{bit}$.

34. The O-SRAM cell of claim 33, wherein the second ring resonator R2 being resonant turns away light feeding the first photodiode D1 thereby turning the first photodiode D1 OFF and making first ring resonator R1 non-resonant to wavelength $\lambda_{bit}$ which keeps the second photodiode D2 in the ON state, leading to Q being HIGH and Q* being LOW.

35. The O-SRAM cell of claim 23, wherein a read/write section includes a third ring resonator R3 controlled by third photodiode D3 and fourth ring resonator R4 controlled by fourth photodiode D4.

36. The O-SRAM cell of claim 35, wherein the read/write section remains OFF during a hold state unless the O-SRAM cell is accessed (or selected) for read/write operations by passing light through a 'wordline' waveguide.

37. The O-SRAM cell of claim 36, wherein the O-SRAM cell is initialized by a write operation ensure either Q=HIGH, Q*=LOW (digital 1) or Q=LOW, Q*=HIGH (digital 0) thereby obviating a condition in which Q and Q* can simultaneously be HIGH or LOW.

38. The O-SRAM cell of claim 36 further comprising:
a third photodiode D3;
a fourth photodiode D4; and
a 'wordline' waveguide that couple a read/write signal to the third photodiode D3 photodiode and the fourth photodiode D4.

39. The O-SRAM cell of claim 38, wherein in order to read a state of the O-SRAM cell, the read/write signal received by the 'wordline' waveguide drives third photodiode D3 and the fourth photodiode D4 to an ON state thereby driving third ring resonator R3 and the fourth ring resonator R4 to be resonant to $\lambda_{bit}$ causing the state Q which is an input of the fourth ring resonator R4 and the state Q* which is an input of third ring resonator R3 to be transferred to a BIT* waveguides via a third ring resonator drop-port and to a BIT waveguide via a fourth ring resonator drop-port, respectively as differential optical outputs.

40. The O-SRAM cell of claim 39, wherein when the O-SRAM cell is initially in Q=LOW and Q*=HIGH state, the second photodiode D2 is in the OFF state and the second ring resonator R2 is off-resonant to $\lambda_{bit}$, while the first photodiode D1 is in the ON state and the first ring resonator R1 is in resonant to $\lambda_{bit}$.

41. The O-SRAM cell of claim 40, wherein a memory output state is flipped, the second photodiode D2 is triggered with an external optical signal.

42. The O-SRAM cell of claim 41, wherein a write operation is initiated by activating third photodiode D3 and the fourth photodiode D4 by providing the read/write signal in the 'wordline' waveguide.

43. The O-SRAM cell of claim 42, wherein an external optical write pulse is then applied at a BIT waveguide, reaching the second photodiode D2 through the fourth ring resonator R4 which is resonant to $\lambda_{write}$, thereby turning ON the second photodiode D2 and subsequently driving the second ring resonator R2 in resonance to the input light having wavelength $\lambda_{bit}$.

44. The O-SRAM cell of claim 43, wherein the second ring resonator R2 being resonant turns away light feeding the first photodiode D1 thereby turning the first photodiode D1 OFF and making first ring resonator R1 non-resonant to wavelength $\lambda_{bit}$ which keeps the second photodiode D2 in the ON state, leading to Q being HIGH and Q* being LOW.

45. The O-SRAM cell of claim 22, further comprising an isolator that blocks light input to an internal laser.

46. A method for fabricating the O-SRAM cell of claim 22, the method comprising:
a) providing a silicon-on-insulator;
b) patterning trenches for germanium deposition;
c) depositing a layer of germanium;

d) patterning for silicon passive photonic devices;
e) patterning is performed for implants P and N doped regions on microring switches and detectors;
f) annealing implants and dopants;
g) forming contacts by silicidation and/or metallization; and
h) forming a back-end of line (BEOL) stack.

47. A method for fabricating the O-SRAM cell of claim 22, the method comprising:
a) providing a silicon-on-insulator;
b) patterning for silicon passive photonic devices
c) patterning trenches for germanium deposition;
d) depositing a layer of germanium;
e) patterning for implants of P and N doped regions for microring switches and detectors;
f) annealing implants and dopants;
g) forming contacts by silicidation and/or metallization; and
h) forming a back-end of line (BEOL) stack.

* * * * *